US009292461B2

(12) United States Patent  
Katano et al.

(10) Patent No.: US 9,292,461 B2  
(45) Date of Patent: Mar. 22, 2016

(54) MANAGEMENT METHOD OF COMPUTER SYSTEM, COMPUTER SYSTEM, AND PROGRAM

(75) Inventors: Shingo Katano, Kawasaki (JP); Takahiko Wakamatsu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1039 days.

(21) Appl. No.: 13/384,947

(22) PCT Filed: Mar. 5, 2010

(86) PCT No.: PCT/JP2010/054157
§ 371 (c)(1),
(2), (4) Date: Mar. 28, 2012

(87) PCT Pub. No.: WO2011/033799
PCT Pub. Date: Mar. 24, 2011

(65) Prior Publication Data
US 2012/0179804 A1     Jul. 12, 2012

(30) Foreign Application Priority Data

Sep. 18, 2009  (JP) ................................ 2009-217437

(51) Int. Cl.
*G06F 13/40*     (2006.01)
(52) U.S. Cl.
CPC .... *G06F 13/4022* (2013.01); *G06F 2213/0026* (2013.01)
(58) Field of Classification Search
None
See application file for complete search history.

(56) References Cited

U.S. PATENT DOCUMENTS

| 2005/0246460 | A1 | 11/2005 | Stufflebeam, Jr. |
| 2008/0250186 | A1 | 10/2008 | Suzuki et al. |
| 2008/0313362 | A1 | 12/2008 | Takamoto |
| 2009/0198862 | A1* | 8/2009 | Okitsu et al. .................. 710/316 |

FOREIGN PATENT DOCUMENTS

| JP | 09-272243 | 10/1997 |
| JP | 2000-339268 | 12/2000 |
| JP | 2005-317021 | 11/2005 |
| JP | 2008-257597 | 10/2008 |
| JP | 2008-310489 | 12/2008 |
| JP | 2009-187490 A | 8/2009 |

OTHER PUBLICATIONS

PCT Search Report and Written Opinion on application No. PCT/JP2010/054157 mailed Jun. 15, 2010; 9 pages.

* cited by examiner

*Primary Examiner* — Angela Nguyen
(74) *Attorney, Agent, or Firm* — Foley & Lardner LLP

(57) ABSTRACT

The system includes a PCI switch connecting a plurality of computers via a PCI interface; and a management server which controls assignment of PCI devices and computers connected to the PCI switch. The PCI switch reports an addition or change of a PCI device to the management server. The management server obtains basic information for the PCI device upon receipt of the report, determines an assignment state of the PCI device to either occupation or sharing, and instructs the PCI switch to assign the PCI device to the management server in the determined assignment state. The management server reads a driver of the PCI device connected through the PCI switch, and obtains detailed information of the PCI device through the driver.

21 Claims, 19 Drawing Sheets

FIG. 5

217 PCI DEVICE TABLE

| PCI Dev. ID (411) | CARD TYPE (412) | VENDOR (413) | PERFORMANCE (TRANSFER RATE) (414) | NUMBER OF PORTS (415) | SUPPORTED DRIVER (416) | F/W Rev. (417) |
|---|---|---|---|---|---|---|
| 0 | NIC | I | 1GBps | 1 | W2KSP4,W2k3R2,W2k8,LX2.30.3 | 1.02 |
| 1 | NIC | I | 1GBps | 2 | W2KSP4,W2k3R2,W2k8,LX2.3.3 | 1.13 |
| 2 | HBA | H | 10GBps | 2 | W2k3R2,W2k8,LX2.3.3 | 2.66 |
| 3 | HBA | Q | 1GBps | 1 | W2k3R2,W2k8,LX2.3.3 | 1.0.1 |
|  |  |  |  |  |  |  |

FIG. 6

216 PCI SWITCH TABLE

| PCIeSW ID | Port # | MOUNTED PCI DEVICE ID | ASSIGNED STATE | SHARING AVAILABILITY | TOPOLOGY INFORMATION |
|---|---|---|---|---|---|
| 511 | 512 | 513 | 514 | 516 | 515 |
| 0 | 4 | 0 | DEDICATED | POSSIBLE | (INFORMATION ON DEVICE OF CONNECTION DESTINATION AND THE LIKE) |
|  | 5 | 1 | DEDICATED | POSSIBLE |  |
|  | 6 | 2 | - |  |  |
|  | 7 | 3 | SHARED | POSSIBLE |  |

FIG. 7

215 SERVER MANAGEMENT TABLE

| SERVER ID (611) | PCIe Port# (612) | CONNECTED PCI SW ID (613) | CONNECTED PCI SW PORT# (614) | APPLIED GROUP ID (615) |
|---|---|---|---|---|
| 0 | 0 | 0 | 0 | 2 |
|   | 1 | 1 | 1 | 3 |
| 1 | 0 | 0 | 0 | 2 |
|   | 1 | 1 | 1 |   |

FIG. 8

218 PCI DEVICE GROUP TABLE

| Group ID (711) | CARD TYPE (712) | VENDOR (713) | PERFORMANCE (TRANSFER RATE) (714) | NUMBER OF PORTS (715) | SUPPORTED DRIVER (716) | F/W Rev (717) | TOPOLOGY INFORMATION (718) |
|---|---|---|---|---|---|---|---|
| 0 | NIC | - | - | - | - | - | - |
| 1 | HBA | - | - | - | - | - | - |
| 2 | NIC | I | - | - | - | - | - |
| 3 | HBA | H | - | - | - | - | - |
| 4 | NIC |   | 10Gbps | - | - | - | - |
| ... |
| N | NIC | - | - | - | DEFAULT DRIVER FOR WIN2K3 SP2 | - | - |

FIG. 16

GROUP ASSIGNMENT WINDOW — 1501

SELECT SERVER [SERVER 1 ▼] — 1502

SELECT PCI PORT [#0 ▼] — 1503

1511 — SEARCH CONDITIONS — 1512

1510
- ☑ TYPE [ANY ▼]  ☐ NUMBER OF PORTS [1 ▼]
- ☑ VENDOR [ANY ▼]  ☐ SUPPORTED DRIVER [ANY ▼]
- ☑ PERFORMANCE [ANY ▼]  ☐ F/W Rev [ANY ▼]
- ☐ PERMIT TO SHARE PCI DEVICE
- ☐ SHOW ONLY ASSIGNABLE CANDIDATES

1521

| | TYPE | VENDOR | PERFORMANCE (TRANSFER RATE) | NUMBER OF PORTS | SUPPORTED DRIVER | F/W Rev |
|---|---|---|---|---|---|---|
| ⦿ | NIC | - | - | - | - | - |
| ○ | HBA | - | - | - | - | - |
| ○ | NIC | I | - | - | - | - |
| ○ | HBA | H | - | - | - | - |
| ○ | NIC | | 10Gbps | - | - | - |
| ○ | NIC | | 20Gbps | | | |
| ○ | NIC | H | 10Gbps | | | |

1520

[ OK ]  [ CANCEL ]

FIG. 20

| | | | | | 1901 |

GROUP EXTRACTION WINDOW

SELECT SERVER OF EXTRACTION SOURCE  [SERVER1 ▼] 1910

SELECT SERVER OF APPLICATION DESTINATION  [SERVER2 ▼] 1911

1920

| PCI Slot# | TYPE | VENDOR | PERFORMANCE (TRANSFER RATE) | NUMBER OF PORTS | SUPPORTED DRIVER | F/W Rev |
|---|---|---|---|---|---|---|
| 0 | NIC | I | 1Gbps | 2 | (INFORMATION FOR IDENTIFYING DRIVER) | 01-00 |
| 1 | HBA | H | 4Gbps | 2 | | 02-10 |

[ OK ]  [ CANCEL ]

MANAGEMENT METHOD OF COMPUTER SYSTEM, COMPUTER SYSTEM, AND PROGRAM

CROSS-REFERENCE TO RELATED PATENT APPLICATIONS

This application is a US national phase application of application PCT/JP2010/054157 filed Mar. 5, 2010 which claims priority to Japan Application 2009-217437 filed Sep. 18, 2009. All of the aforesaid applications are incorporated herein by reference in their entirety as if fully set forth herein.

BACKGROUND

This invention relates to a computer system in which a plurality of computers and a plurality of PCI devices are connected by a PCI switch, and more particularly, to management of a PCI switch.

PCI devices are conventionally mounted in slots in a computer, and hence the number of PCI devices which can be mounted is limited, and it is not necessary to centrally manage the PCI devices in a plurality of computers. However, the PCI Express Switch (hereinafter, referred to as PCIe SW) has recently been brought into practice as an I/O switch, and in a computer system employing the PCIe SW, a plurality of servers (blades) are connected to the PCIe SW, to which a large number of PCI devices are connected. As a result, PCI devices required by each of the servers can be flexibly assigned. The number of mounted PCI (or PCI Express) devices in the computer system in which the PCIe SW and the plurality of servers (blades) are mounted increases to several tens of times of the number in the conventional case. It should be noted that the PCI device is an I/O device compliant with the PCI or PCI Express standard.

It is necessary to manage the large number of PCI devices mounted on the PCIe SW, and to recognize information on the mounted PCI devices, assigned states thereof to the servers, and the like in order to properly assign a PCI device required by each of the servers in the computer system.

As a method of acquiring information on PCI devices in a computer system including an I/O switch, there is known a technology in which, when a new I/O device has been connected to the PCIe SW or when an I/O device has been replaced due to failure, a management server acquires information on the I/O device via a management interface of the I/O switch (refer to JP 2008-310489 A, for example).

SUMMARY

According to the above-mentioned conventional technology, the information on PCI devices which the management server can acquire from the management interface of the PCIe SW is only basic information specified by a PCI bus protocol, and is insufficient as information used for management by an administrator, and hence the administrator must manually acquire and manage more detailed information. As a result, there occurs a problem that a period required for setting operation increases, and that a risk of making a setting mistake considerably increases.

In other words, the basic information on the PCI devices specified by the PCI bus protocol includes a vendor ID, a device ID, and a class code, and thus it is possible to determine the type of the PCI device and the like. On the other hand, the administrator of the computer system runs various types of OSs on a plurality of servers, and needs to assign PCI devices out of the plurality of the PCI devices to each of the OSs. When the administrator carries out the assignment, a driver for the PCI device to be assigned may not be included in standard drivers of the OS depending on the type and version of the OS (kernel version and service pack version). In this case, the administrator needs to find a driver for the PCI device corresponding to the OS of a target server, or a PCI device supported by the OS out of the other PCI devices. Alternatively, if a plurality of virtual servers are provided by means of a virtualization technology such as a virtual machine manager (VMM) and a hypervisor, the virtualization technology may not be applied to a PCI device including a firmware of an old revision.

The administrator must assign a PCI device which the OS can use without fail in accordance with variation in type and version of the OS to be run, and variation in type, version, and revision of the firmware of the PCI device. However, with the basic information on the PCI device according to the conventional technology alone, there is a problem that whether or not the PCI device can be operated by the standard driver of the target OS cannot be easily determined. In a case where the virtualization technology is used, there occurs a problem that the administrator cannot easily recognize whether or not a revision of the firmware of the PCI device and the like support the virtualization technology based only on the basic information on the PCI device.

This invention has been made in view of the above-mentioned problems, and therefore has an object to provide a computer system for automatically acquiring detailed information on a PCI device (information at a function level required for management, such as type and performance) and allowing the administrator to easily search for a PCI device to be assigned to a server in order to manage a PCIe SW.

A representative aspect of this invention is as follows. A management method for a computer system for controlling assignment between computers and PCI devices, the computer system comprising: a plurality of the computers each comprising a processor, a memory, and a PCI interface; at least one of PCI switches for connecting the plurality of computers via the PCI interfaces; a plurality of the PCI devices to be connected to the at least one of PCI switches; and a management server comprising a PCI device table for managing the plurality of the PCI devices connected to the at least one of PCI switches, thereby controlling assignment between the plurality of the PCI devices and the plurality of the computers, the management method comprising the steps of: notifying, by the PCI switch, the management server one of addition and change of the PCI device, and addition of the PCI switch; receiving, by the management server, the notification, and requesting the PCI switch to acquire basic information on the PCI device; receiving, by the PCI switch, the request to acquire the basic information, acquiring the basic information on the PCI device, and notifying the management server of the basic information; receiving, by the management server, the basic information, determining an assigned state of the PCI device as any one of a dedicated state and a shared state, and requesting the PCI switch to assign the PCI device to the management server in the determined assigned state; receiving, by the PCI switch, the request of assignment from the management server, and connecting the PCI device and the management server to each other in the assigned state determined by the management server; reading, by the management server, a driver for the PCI device connected via the PCI switch, and acquiring detailed information on the PCI device via the driver; and storing, by the management server, the acquired detailed information on the PCI device in the PCI device table.

Therefore, this invention can provide a computer system capable of automatically acquiring detailed information on a PCI device (information at the function level required for the management, such as type and performance) each time the PCI device is newly added or changed for managing the PCIe switch, and allowing the administrator to easily search for a PCI device to be assigned to the server.

BRIEF DESCRIPTION OF THE DRAWINGS

FIG. 5 is an explanatory diagram illustrating an example of the PCI device table FIG. 6 illustrates an example of a PCI switch table 216, and is an explanatory diagram relating to a table for the PCIe switch #0 according to the first embodiment of this invention.

FIG. 7 is an explanatory diagram illustrating an example of a server management table according to the first embodiment of this invention.

FIG. 8 is an explanatory diagram illustrating an example of a PCI device group table according to the first embodiment of this invention.

FIG. 16 is a screen image of the group assignment screen according to the first embodiment of this invention.

FIG. 20 illustrates a screen image of the group extraction screen according to the third embodiment of this invention.

DETAILED DESCRIPTION OF THE PREFERRED EMBODIMENTS

A description is now given of an embodiment of this invention referring to accompanying drawings.

First Embodiment

Figure 1:
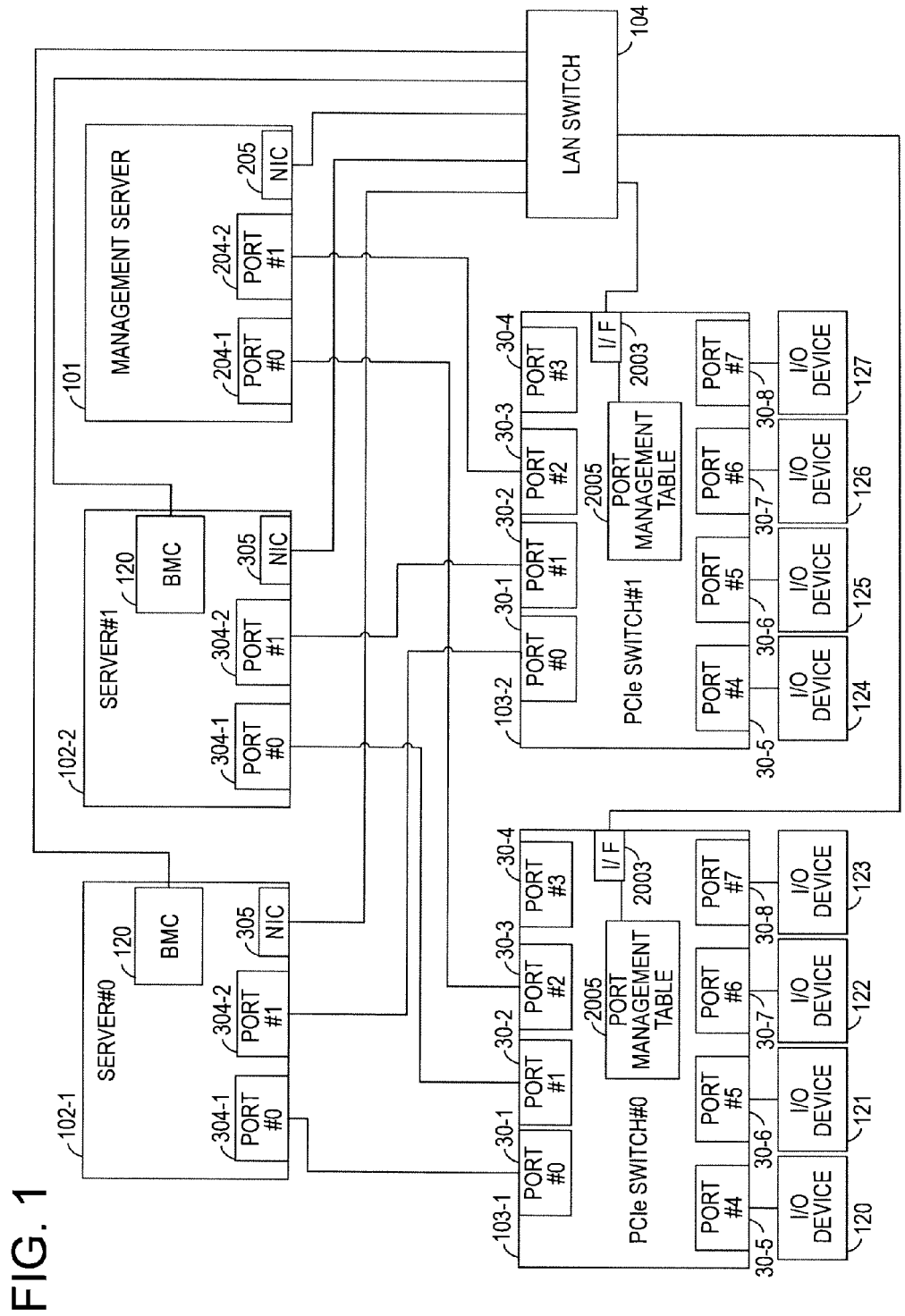
FIG. 1 is a block diagram of a computer system according to the first embodiment of this invention.

FIG. 1 is a block diagram of a computer system according to the first embodiment of this invention. The computer system is mainly constructed by one or more servers (blades) 102-1 and 102-2, which are computers, one or more PCIe switches (or PCI switches) 103-1 and 103-2 which can change a connection state between PCI devices 120 to 127 serving as I/O devices and the servers 102-1 and 102-2, PCI devices 120 to 127 serving as I/O devices, and a management server 101 for managing the servers 102-1 and 102-2 and the PCIe switches 103-1 and 103-2 of the computer system in FIG. 1.

It should be noted that a configuration in which there are two servers 102-1 and 102-2 as physical computers and two PCIe switches 103-1 and 103-2 is illustrated in FIG. 1, and the two servers 102-1 and 102-2 are identified as server #0 and server #1, respectively, and the two PCI switches 103-1 and 103-2 are identified as PCIe switch #0 and PCI switch #1, respectively.

The management server 101, the servers #0 and #1, and the PCIe switches #0 and #1 are coupled to a LAN switch 104 via a network interface (NIC). The management server 101 assigns, via the LAN switch 104, the PCI devices 120 to 127 coupled to the PCIe switches #0 and #1 to the servers #0 and #1.

Moreover, the servers #0 and #1 and the management server 101 include PCIe switch interfaces 304 and 204, and ports of the PCIe switch interfaces are connected to ports of the PCIe switches #0 and #1 in a peer-to-peer configuration for using the PCI devices 120 to 127.

The servers #0 and #1 each include a baseboard management controller (BMC) 120 for providing control relating to operation such as initialization and turning on/off of each of the servers. The BMCs 120 are coupled to the management server 101 via the LAN switch 104, and the management server 101 can detect a failure of the servers #0 and #1, and can turn on/off the servers #0 and #1.

On this occasion, the PCIe switches #0 and #1 are compliant with the multi root I/O virtualization (MR-IOV) or single ROOT I/O virtualization (SR-IOV). What are standardized by PCI-SIG may be applied as the MR-IOV or the SR-IOV. Moreover, the PCIe switch interfaces 304 and 204 of the servers #0 and #1, and the management server 101, the PCIe switches #0 and #1, and the PCI devices 120 to 127 are compliant with a standard of PCIexpress developed by the above-mentioned PCI-SIG.

The management server 101 includes a PCI device management module for managing the connection states between the servers #0 and #1 and the PCIe switches #0 and #1 and the connection states between the PCIe switches #0 and #1 and the PCI devices 120 to 127, and assigns the PCI devices 120 to 127 to each of the servers #0 and #1 as described later. The management server 101 updates the connection states between the servers #0 and #1 and the PCI devices 120 to 127 by setting management tables in the PCIe switches #0 and #1 via the LAN switch 104. The management server 101 can notify the servers #0 and #1 of the states of the PCI devices 120 to 127 and the PCIe switches #0 and #1 via the LAN switch 104. The LAN switch 104 functions as a management network for the computer system. A LAN switch used by the servers #0 and #1 for communicating with external computers may be provided independently.

A detailed description is now given of the respective components of the computer system.

<Servers>

Figure 3:
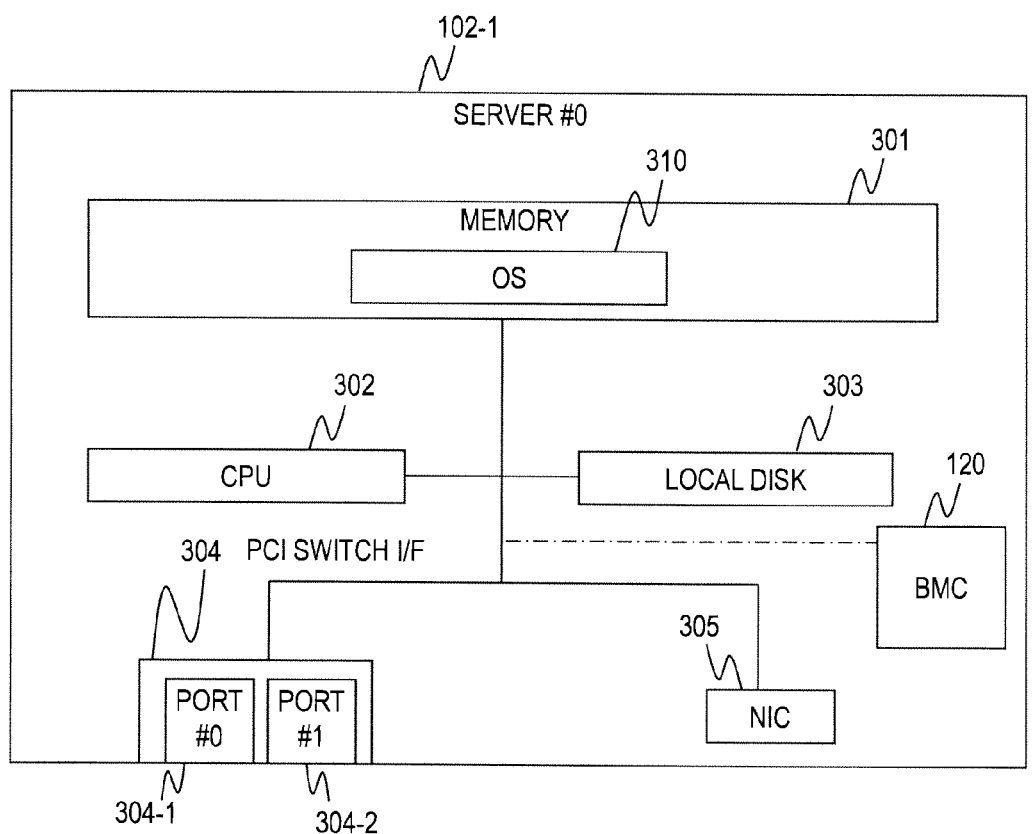
FIG. 3 is a block diagram illustrating a configuration of the server #0 according to the first embodiment of this invention.

FIG. 3 is a block diagram illustrating a configuration of the server #0 (102-1). The servers #0 and #1 have the same configuration, and hence a description is given of only the server #0 (102-1).

The server #0 is mainly constructed by one or more CPUs (processors) 302, a memory 301, a local disk 303 serving as a machine-readable medium, a PCIe switch interface 304 for connecting to the PCIe switches #0 and #1, a network interface 305 for connecting to the LAN switch 104, and the BMC 120 for controlling a power supply and monitoring the operation state of the server #0. The PCIe switch interface 304 includes two ports #0 and #1 (304-1 and 304-2), the port #0 is connected to a port #0 of the PCIe switch #0, and the port #1 is connected to a port #0 of the PCIe switch #1 in the example illustrated in FIG. 3.

An OS 310 is loaded on the memory 301, and is executed by the CPU 302.

<PCIe Switches>

Figure 4:
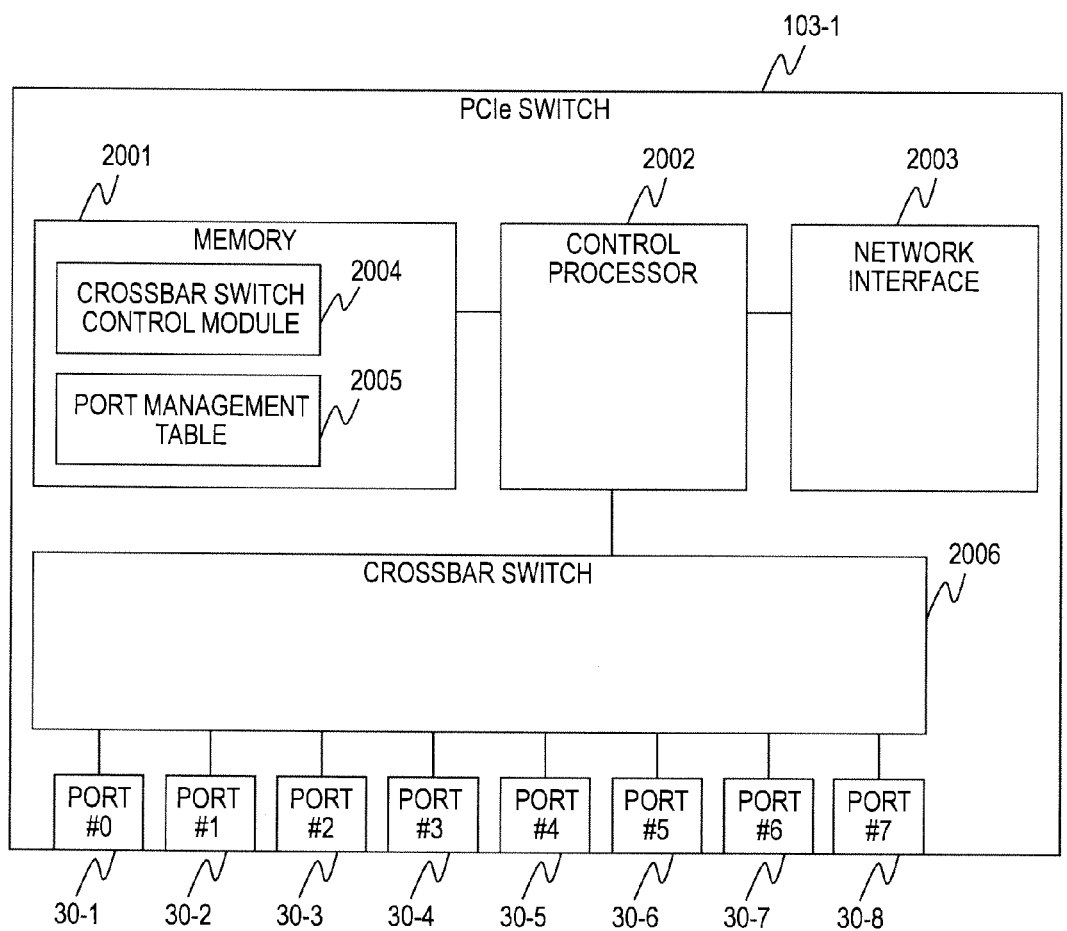
FIG. 4 is a block diagram illustrating a configuration of the PCIe switch #0 according to the first embodiment of this invention.

FIG. 4 is a block diagram illustrating a configuration of the PCIe switch #0 (103-1). The PCIe switches #0 and #1 have the same configuration, and hence a description is given of only the PCIe switch #0 (103-1).

The PCIe switch #0 is mainly constructed by a crossbar switch 2006 for connecting ports #0 to #7 (30-1 to 30-8) in the peer-to-peer configuration, a control processor 2002 for controlling the crossbar switch 2006, a memory 2001, and a network interface 2003 for connecting to the LAN switch 104.

According to this embodiment, the ports #0 to #3 out of the ports #0 to #7 comprise upstream ports to be connected to the computers such as the servers #0 and #1, and the management server 101, and the ports #4 to #7 comprise downstream ports to be connected to the PCI devices. It should be noted that the downstream ports #4 to #7 may be connected to slots in an I/O drawer (not shown) which can store a plurality of PCI devices.

A crossbar switch control module 2004 as software for controlling the crossbar switch 2006 is loaded to the memory 2001, and is executed by the control processor 2002. Moreover, a port management table 2005 used by the crossbar switch control module 2004 is stored in the memory 2001. The port management table 2005 manages connection states and the shared/dedicated states of the ports #0 to #3 as the upstream ports and the ports #4 to #7 as the downstream ports, which is not illustrated.

The crossbar switch control module 2004 receives an instruction from the management server 101 via the network interface 2003, determines connection relationships between the ports #0 to #3 as the upstream ports and the ports #4 to #7 as the downstream ports, and updates the port management table 2005. The crossbar switch control module 2004 transmits contents of the port management table 2005 in response to a request from the management server 101.

Moreover, when the connection states of the ports #0 to #7 change, the crossbar switch control module 2004 notifies the management server 101 of the generation of change. The change in the connection state corresponds to, for example, a case in which a new PCI device is coupled to the downstream port, a case in which an existing PCI device is removed from the downstream port, a case in which a new server is coupled to the upstream port, or a case in which an existing server is removed from the upstream port. When the state changes in this way, the crossbar switch control module 2004 notifies the management server 101 of contents (such as an identifier of a port, and an identifier of a server or a PCI device) of the change in state. When a new PCIe switch is coupled to the downstream port of the PCIe switch #0, or an existing PCIe switch is removed from the downstream port, the crossbar switch control module 2004 notifies the management server 101 of contents of the change in the connection state as in the case of the change in the PCI device. The PCIe switch #0 monitors the connection states of the ports #0 to #7, and when the connection state changes, the PCIe switch #0 notifies the management server 101 of contents of the change in this way.

<Management Server>

Figure 2:
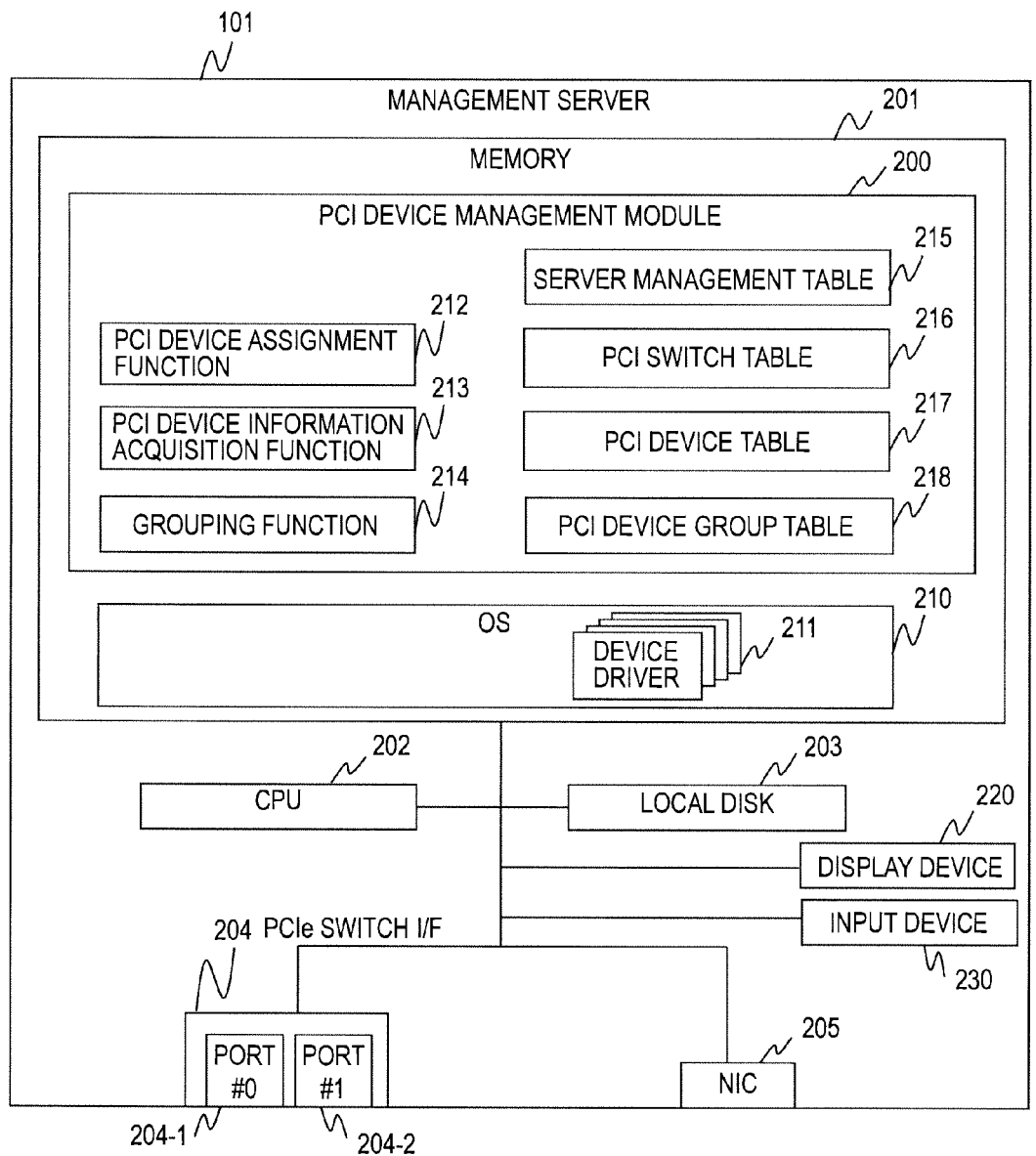
FIG. 2 is a block diagram illustrating a configuration of the management server according to the first embodiment of this invention.

FIG. 2 is a block diagram illustrating a configuration of the management server 101. The management server 101 is mainly constructed by one or more CPUs (processors) 202, a memory 201, a local disk 203 serving as a computer-readable non-transitory data storage medium, a PCIe switch interface 204 for connecting to the PCIe switches #0 and #1, a network interface 205 for connecting to the LAN switch 104, an input device 230 constructed by a mouse and a keyboard for receiving an input and an operation, and a display device 220 constructed by a display or the like for providing a user interface. The PCIe switch interface 204 includes two ports #0 and #1 (204-1, 204-2), and the port #0 is connected to a port #2 of the PCIe switch #0, and the port #1 is connected to a port #2 of the PCIe switch #1 in the example illustrated in FIG. 1.

An OS 210 is loaded on the memory 201, and is executed by the CPU 202. A PCI device management module 200 is executed on the OS 210. The PCI device management module 200 is constructed by a program stored in the local disk 203, and the PCI device management module 200 is loaded by the CPU 202 from the local disk 203 on the memory 201, and is executed by the CPU 202.

The OS 210 manages the execution of the PCI device management module 200, and, when acquiring detailed information on a PCI device, reads a device driver 211 prepared in advance, and acquires the detailed information on the PCI device via the device driver 211 as described later. Device drivers 211 other than those provided for the OS 210 as default may be stored in the local disk 203, and may be properly read.

The PCI device management module 200 manages changes in setting of the PCIe switches #0 and #1, and assignments of the PCI devices 120 to 127 to the servers #0 and #1. Therefore, the PCI device management module 200 includes a PCI device assignment function 212 for managing assignment states of the PCI device 120 to 127 to the servers #0 and #1 based on information in respective tables described later, a PCI device information acquisition function 213 for acquiring detailed information on the PCI devices 120 to 127, to thereby update a PCI device table 217, and a PCI device group table 218, and a grouping function 214 for providing an administrator using the management server 101 with the PCI devices 120 to 127, with respect to each type of the PCI devices 120 to 127, or the like, based on information in the PCI device group table 218.

The respective function modules of the PCI device management module 200 are described later.

A detailed description is now given of respective tables used by the PCI device management module 200. The respective tables are stored in the memory 201, and are set and updated by the respective function modules of the PCI device management module 200.

FIG. 7 is an explanatory diagram illustrating an example of a server management table 215. The server management table 215 is set based on information acquired by the PCI device assignment function 212 from the servers #0 and #1 (servers #0 and #1 are generally referred to as servers hereinafter), and the PCIe switches #0 and #1 (PCIe switches #0 and #1 are generally referred to as PCIe switches hereinafter), and information set by the administrator using the management server 101. Moreover, the administrator of the management server 101 may set the server management table 215.

One entry of the server management table 215 is constructed by a server ID 611 for storing an identifier of a server, a PCIe port number 612 for storing an identifier of the port 304-1 or 304-2 of the PCIe switch interface 304 of the server, a connected PCI switch ID 613 for storing an identifier of the PCIe switch #0 and #1 connected to the port of the server, a connected PCI switch port number 614 for storing an identifier of a port of the PCIe switch to which the port of the server is connected, and an applied group ID 615 for storing an identifier of a group (group ID) assigned to the PCI device 120 to 127 coupled to the downstream port of the PCIe switch (PCI devices 120 to 127 are generally referred to as PCI devices hereinafter). Each of the identifiers is a number to which "#" is added in FIG. 1, and for example, the server 102-1 is server #0, and the identifier thereof is thus "0".

The applied group ID 615 is a group ID of PCI devices which the administrator wishes to assign to the server as described later. The group ID of the PCI devices is specified depending on differences of a type, a performance, a vendor, a supported driver, and the like of the PCI device as described later.

The server ID 611, the PCIe port number 612, the connected PCI switch ID 613, and the connected PCI switch port number 614 of the server management table 215 can be updated by the PCI device assignment function 212 of the management server 101 reading information on a PCI bus tree acquired by the PCIe switch interface 304 when the server starts or is reset.

FIG. 6 illustrates an example of a PCI switch table 216, and is an explanatory diagram relating to a table for the PCIe switch #0. The PCI switch table 216 is updated when the PCI device assignment function 212 assigns a PCI device to a server, for example. Moreover, the administrator of the management server 101 may set the PCI switch table 216. The same table is also constructed for the PCIe switch #1, which is not illustrated.

One entry of the PCI switch table 216 is constructed by a PCIe switch ID 511 for storing an identifier of a PCIe switch, a port number 512 for storing an identifier of a downstream port of the PCIe switch, a mounted PCI device ID 513 for storing an identifier of a PCI device connected to the PCI port number 512, an assigned state 514 for indicating whether the PCI device connected to the downstream port is in the shared state or the dedicated state, a sharing availability 516 indicating whether the PCI device connected to the downstream port can be shared, and topology information 515 for storing information on a device to which the PCI device is connected.

The PCIe switch ID 511, the port number 512, and the mounted PCI device ID are acquired by the PCI device assignment function 212 from the PCIe switch. The assigned state 514, the sharing availability 516, and the topology information 515 can be set by the administrator using the management server 101. If the assigned state 514 is "SHARED", it represents that the PCI device is shared by a plurality of servers, and if the assigned state 514 is "DEDICATED" or "-", the PCI device is assigned to a single server. If the sharing availability 516 is "POSSIBLE", the PCI device specified by the mounted PCI device ID can be shared by a plurality of servers. If the PCI device cannot be shared, a blank or "IMPOSSIBLE" is set. What device is connected to the PCI device can be set to the topology information 515 by the administrator or the like. For example, if the type of the PCI device is a NIC, information on a segment of a network or the like is stored in the topology information 515, if the type of the PCI device is a host bus adaptor (HBA), an identifier of a connected storage device or the like is stored in the topology information 515, and information useful for the administrator to assign the PCI device to another server is thus stored.

FIG. 5 is an explanatory diagram illustrating an example of the PCI device table 217. To the PCI device table 217, the PCI device information acquisition function 213 sets information acquired from each of PCI devices by means of processing described later. Moreover, the administrator of the management server 101 can set the PCI device table 217.

One entry of the PCI device table 217 is constructed by a PCI device ID 411 for storing an identifier of a PCI device, a card type 412 for storing a type of the PCI device, a vendor 413 for storing a vendor name of the PCI device, a performance 414 for storing performance information such as a transfer rate and a compliant standard of the PCI device, a number of ports 415 for storing the number of ports the PCI device has, a supported driver 416 for storing information on a device driver 211 which can operate the PCI device, and a firmware revision 417 for storing a version of firmware of the PCI device.

The PCI device information acquisition function 213 acquires the PCI device ID 411, the card type 412, the vendor 413, the performance 414, the number of ports 415, and the firmware revision 417 thereby updating the PCI device table 217 by means of processing mentioned later. The administrator using the management server 101 can set the supported driver 416. A type, a version, a kernel version, a service pack version, and the like of an OS which can recognize the PCI device via the device driver 211 provided by default for the OS are preferably set as the information stored in the supported driver 416. Alternatively, version information on the device driver 211 may be set for each type of OS.

FIG. 8 is an explanatory diagram illustrating an example of a PCI device group table 218. The PCI device group table 218 is generated by the grouping function 214 as described later.

One entry of the PCI device group table 218 is constructed by a group ID 711 for storing a group ID, a card type 712 indicating a type of a PCI device, a vendor 713 for storing a vendor name of the PCI device, a performance 714 for storing performance information on the PCI device, a number of ports 715 indicating the number of ports implemented on the PCI device, a supported driver 716 storing a type and a version of an OS including a device driver 211 required for operating the PCI device, a firmware revision 717 for storing a revision of firmware of the PCI device, and topology information 718 for storing information on a device coupled to the PCI device.

For example, for a case of a group ID=0, PIC devices whose types are the network interface (NIC) are searched for, and, for a case of ID=N, PIC devices whose types are the network interface, and which can use the device driver 211 provided for Microsoft Windows 2003, SP2 by default are searched for.

<Processing by PCI Device Management Module>

A description is now given of an example of processing carried out by each of the functions of the PCI device management module 200.

<PCI Device Information Acquisition Function>

Figure 9:
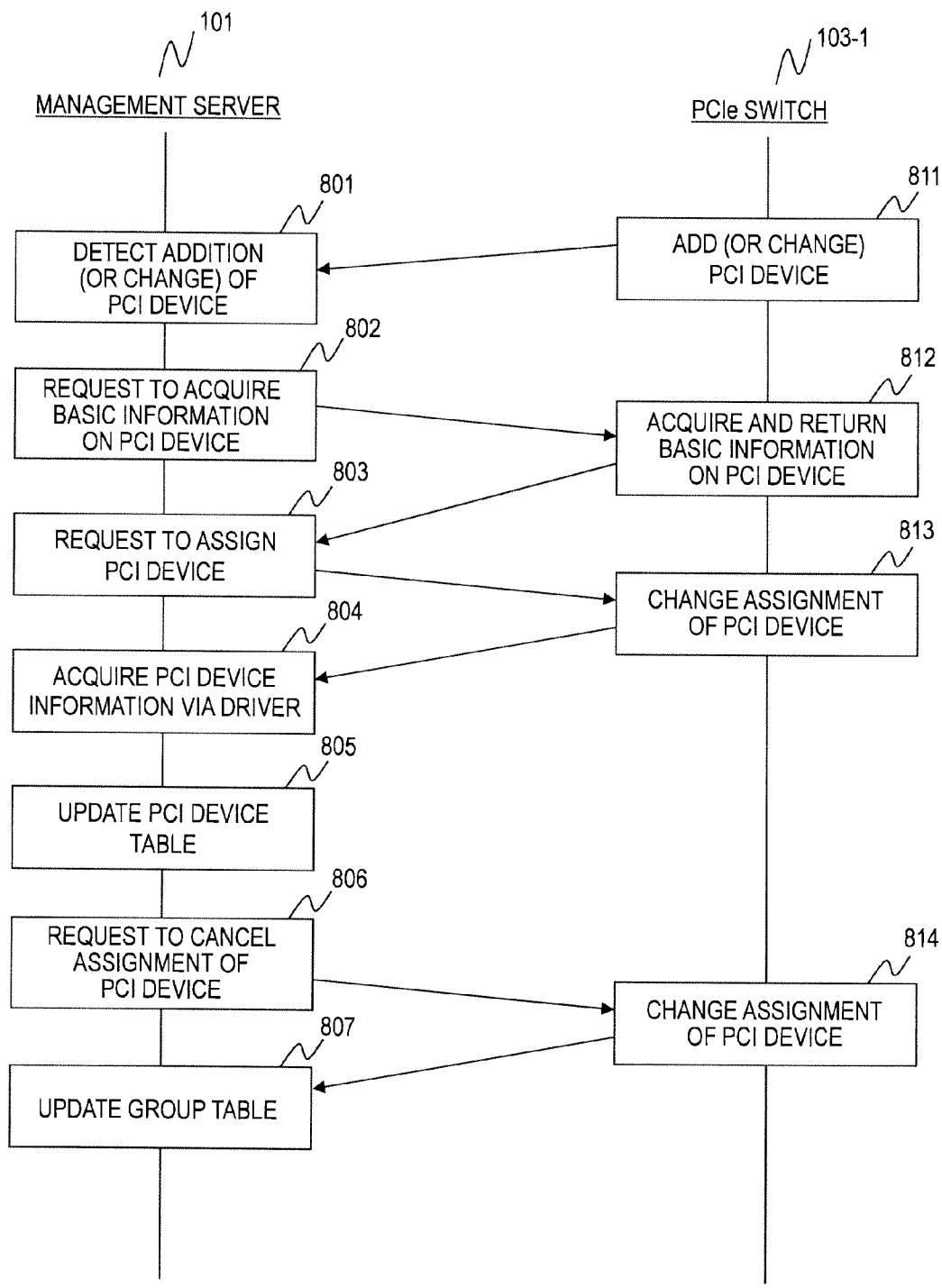
FIG. 9 is a sequence diagram illustrating an example of processing by the PCI device information acquisition function according to the first embodiment of this invention.

FIG. 9 is a sequence diagram illustrating an example of processing by the PCI device info illation acquisition function 213 of the PCI device management module 200. First, a PCIe switch detects addition or change of a PCI device, and notifies the management server 101 of the addition or change via the LAN switch 104 in Step 811. The crossbar switch control module 2004 detects addition or change when a PCI device coupled to the downstream ports #4 to #7 of the crossbar switch 2006 does not match the port management table 2005, and identifies the downstream port as a coupled position. The crossbar switch control module 2004 notifies the management server 101 of the generation of a change of the PCI device. Moreover, the crossbar switch control module 2004 updates the port management table 2005. This update updates the PCI device coupled to the downstream port at which the change has occurred.

The management server 101 receives the notification of change or addition of the PCI device from the PCIe switch, thereby detecting a change generated to the PCI device in Step 801. It should be noted that a PCIe switch issues the same notification as that in Step 811, also when the PCIe is newly added to the computer system.

The management server 101 requests the PCIe switch for basic information and a coupled position of the changed PCI device in Step 802. The basic information includes a PCI device ID (device number), a card type, and a vendor name. The coupled position is an identifier of the downstream port.

The crossbar switch control module 2004 of the PCIe switch receives the request of the management server 101, and accesses the changed PCI device via the crossbar switch 2006, thereby acquiring the basic information in Step 812. The basic information is acquired in accordance with the PCI bus protocol. The PCIe switch then transmits the acquired basic information to the management server 101.

The management server 101, which has received the basic information, requests the PCIe switch to assign the added or changed PCI device at the downstream port to the management server 101 in Step 803. The management server 101 may refer to the PCI switch table 216 corresponding to the PCI device ID or the like, thereby determining whether the changed PCI device is new (added) or is changed, and may request to assign the PCI device in the dedicated state when the PCI device is new or added, or in the shared state when the PCI device is changed.

Figure 10:
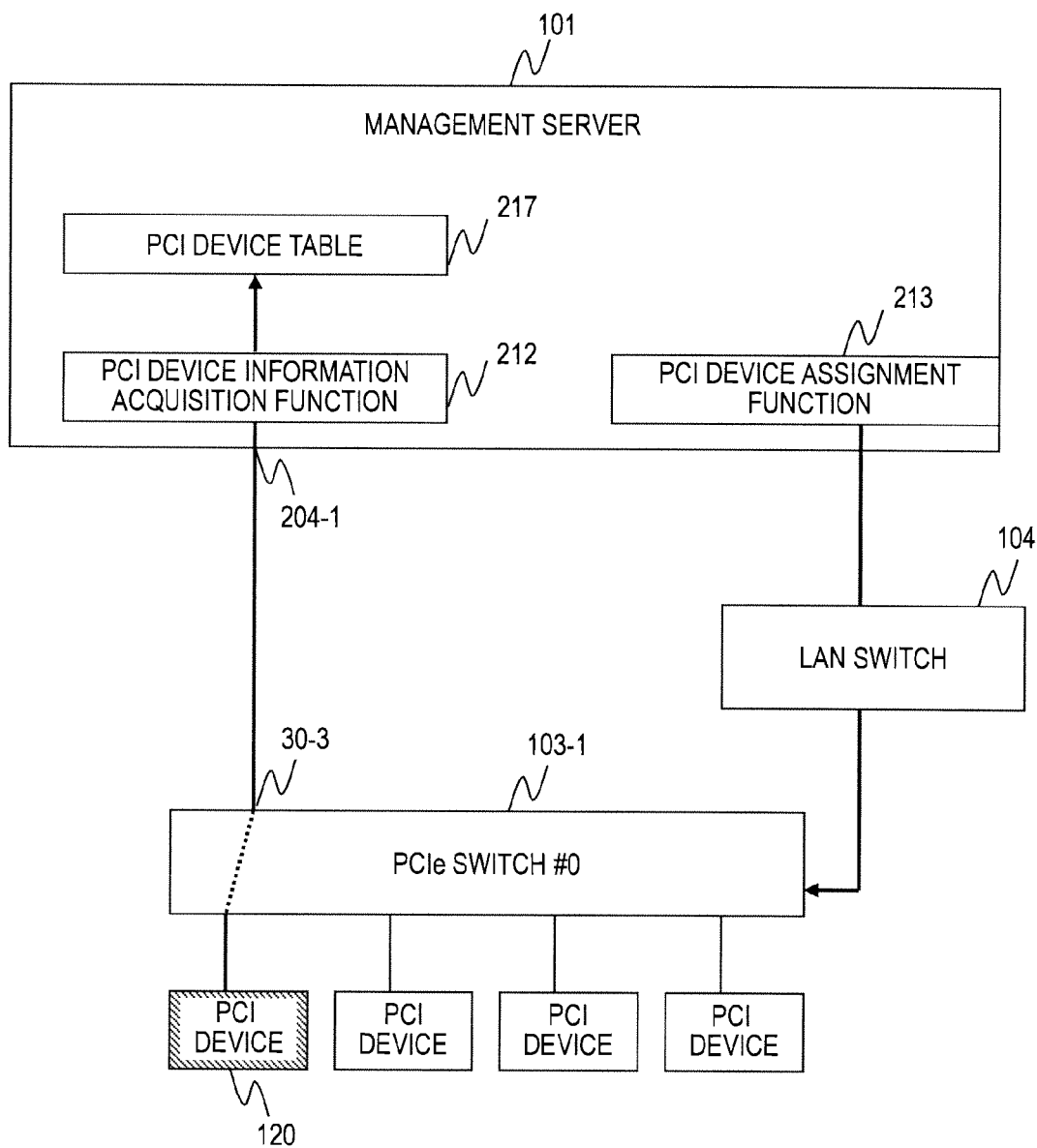
FIG. 10 is a block diagram illustrating a state in which the PCI device is temporality assigned to the management server according to the first embodiment of this invention.

The PCIe switch receives the assignment request from the management server 101, and assigns the PCI device to be assigned to the management server 101 in Step 813. In other words, the PCIe switch updates the port management table 2005, and changes the setting of the crossbar switch 2006, thereby changing the connection relationship between the downstream port and the upstream port. When a change is made to the PCI device 120 coupled to the port #4 of the PCIe switch #0 illustrated in FIG. 1, for example, the PCIe switch #0 couples the port #4 to the port #2 (30-3), thereby communicating the port #0 of the management server 101 and the PCI device 120 with each other as illustrated in FIG. 10. FIG. 10 is a block diagram illustrating a state in which the PCI device 120 is temporality assigned to the management server 101. On this occasion, if the PCI device 120 has already been assigned to another server, the PCIe switch #0 updates the port management table 2005 thereby changing the assigned state of the PCI device 120 to the shared state. The PCIe switch #0 then updates the port management table 2005. If the PCI device 120 cannot be assigned in the shared state, it is possible to notify the management server 101 of an error.

The PCIe switch which has assigned the PCI device 120 to the management server 101 notifies the management server 101 of completion of the assignment and contents of the assignment.

In Step 804, the management server 101 then receives the completion notification of the assignment and the contents of the assignment and is coupled to the PCI device, and hence loads a device driver 211 based on the basic information received in Step 803. On this occasion, when the OS 210 does not provide a corresponding device driver 211, the management server 101 requests the administrator for a device driver 211.

The management server 101 then acquires detailed information on the PCI device via the device driver 211 for the assigned PCI device. The detailed information is information to be stored in the PCI device table 217, and the management server 101 acquires the performance information (transfer rate and compliant standard), the number of ports, and the firmware revision, for example. Regarding a device driver 211 supporting the PCI device, a list of a plurality of device drivers held by the OS 210 may be output to the display device 220 for selection by the administrator. Moreover, if a connection destination of the PCI device can be acquired, the management server 101 reads information on the connection destination, and stores the information as the topology information in the memory 201.

In Step 805, the management server 101 then updates the PCI device table 217 based on the detailed information on the PCI device acquired in Step 804, and the basic information acquired in Step 802. The management server 101 sets the PCI device ID 411, the card type 412, and the vendor 413 from the basic information, and sets the performance 414, the number of ports 415, the supported driver 416, and the firmware revision 417 from the detailed information. If there is the same PCI device as the added or changed PCI device in the PCI device table 217, a new entry is not generated, and the update is not carried out.

In Step 806, the detailed information on the added or changed PCI device has now been acquired, and the management server 101 then transmits a request to cancel the assignment of the PCI device to which the management server 101 is presently coupled to the PCIe switch.

In Step 814, the PCIe switch receives the request to cancel the assignment of the management server 101, and releases the connection of the management server 101 and the PCI device. For this purpose, the PCIe switch controls the crossbar switch 2006 to disconnect the communication path between the upstream port coupled to the management server 101 and the downstream port coupled to the PCI device subject to the coupling. If the assignment of the PCI device which has been coupled to the management server 101 was in the shared state, the PCIe switch returns the state to the original state (such as the dedicated state). The PCIe switch then updates the port management table 2005, thereby restoring the port management table 2005 to the state before the connecting to the management server 101, resulting in completion of the change in the assignment (disconnecting). When the disconnection of the management server 101 and the PCI device has been completed, the PCIe switch transmits a notification of the completion to the management server 101. The PCIe switch restores the connection state of the PCI device to the state before the connecting to the management server 101 in this way.

In Step 807, the management server 101 receives the completion notification of the disconnecting from the PCIe switch, updates the PCI device group table 218 if needed, and completes the processing. Regarding the update of the PCI device group table 218, if a new entry is added to the PCI device table 217 in Step 805, a new PCI device has been connected to the PCIe switch, and hence the basic information and the detailed information on the new PCI device are added to the PCI device group table 218 as described later.

Through the above-mentioned processing, when a PCI device is added to the PCIe switch or a change (removal of a PCI device, or addition or removal of a PCIe switch) is made, the PCI device information acquisition function 213 of the management server 101 is activated by a notification from the PCIe switch, and the management server 101 and the changed PCI device are temporarily connected to each other.

The OS 210 on the management server 101 reads a device driver 211 for the connected PCI device, and can thereby acquire the detailed information on the PCI device via this device driver 211, and sets the acquired detailed information in the PCI device table 217. When the PCI device table 217 is updated, the changed PCI device becomes available for a server by disconnecting the management server 101 and the PCI device from each other, thereby restoring the original state.

Figure 11:
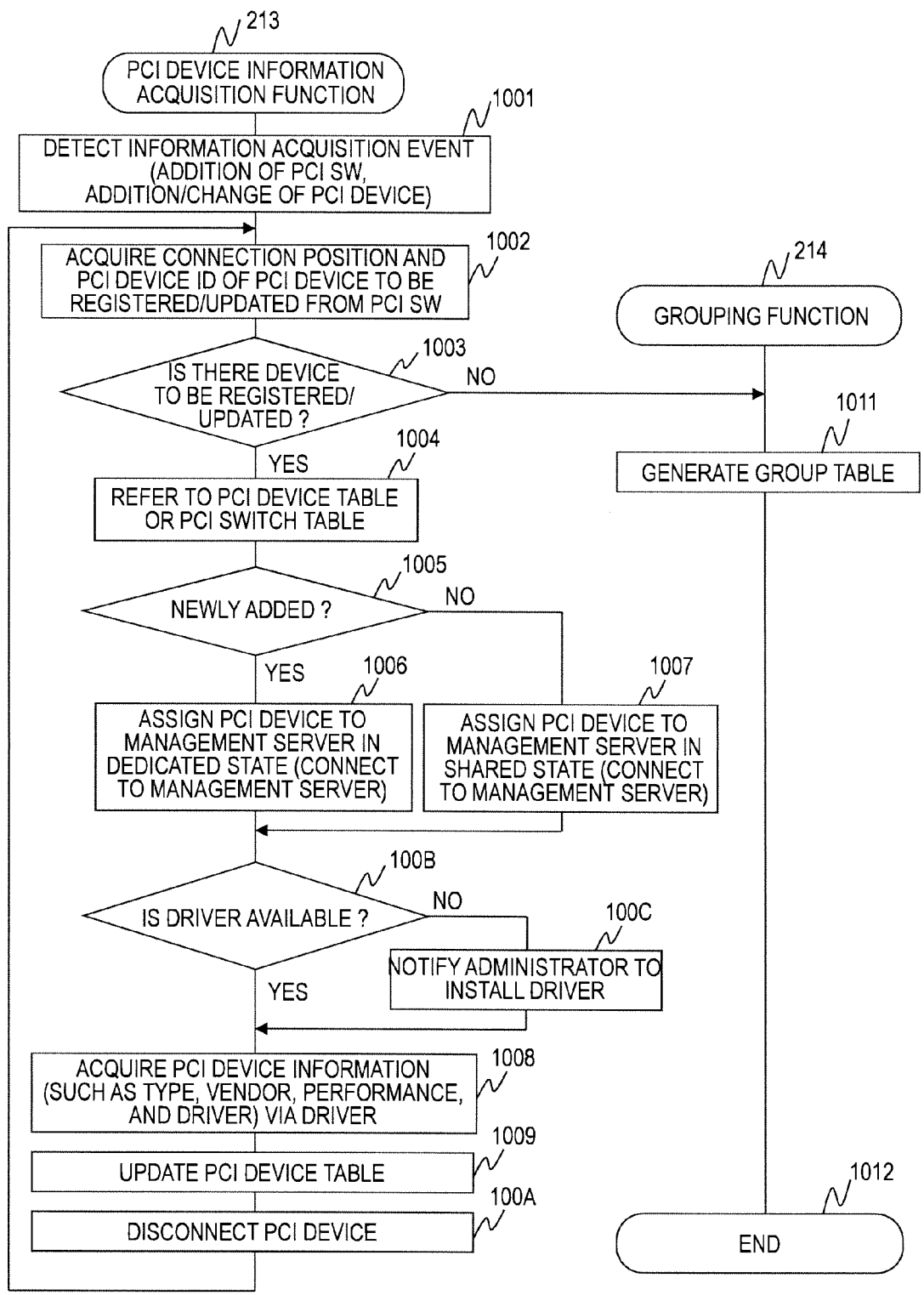
FIG. 11 is a flowchart illustrating an example of detailed processing by the PCI device information acquisition function according to the first embodiment of this invention.

FIG. 11 is a flowchart illustrating an example of detailed processing by the PCI device information acquisition function 213 carried out in Steps 801 to 807 in FIG. 9.

In Step 1001, the PCI device information acquisition function 213 receives the notification indicating the change from the PCIe switch, thereby detecting addition or removal of a PCI device or a PCIe switch.

The management server 101 requests the PCIe switch for the basic information and connected position of the notified PCI device, thereby acquiring the basic information (PCI device ID) and the connected position from the PCIe switch in Step 1002 as described in Steps 802, 812.

In Step 1003, the PCI device information acquisition function 213 determines whether registration to or update of the PCI device table 217 and the like is necessary for the PCI device acquired from the PCIe switch. As a result of this determination, if the detailed information on the PCI device acquired in Step 1002 has not been acquired, the PCI device information acquisition function 213 proceeds to Step 1004, and if the detailed information has already been acquired, the PCI device information acquisition function 213 proceeds to Step 1011 for generating the PCI device group table 218. If the change detected in Step 1001 is a deletion (removal) of a PCI device, processing in Steps 1006 to 1008 and 100A is omitted, and only the update of the PCI device table 217 and the PCI switch table 216 is necessary.

In Step 1004, the PCI device information acquisition function 213 refers to the PCI device table 217 and the PCI switch table 216, proceeds to Step 1005, and determines whether the PCI device whose PCI device ID and connected position are acquired in Step 1002 is a newly added PCI device. In other words, if there is not the acquired PCI device ID in the PCI device table 217, the PCI device information acquisition function 213 determines that the PCI device is newly added, proceeds to Step 1006, and requests the PCIe switch for assignment so that the PCI device is dedicated to the management server 101.

On the other hand, if there is the acquired PCI device ID in the PCI switch table 216, and the connected position (identifier of a downstream port) is to be changed, and the sharing availability 516 is "POSSIBLE", the PCI device information acquisition function 213 proceeds to Step 1007, and requests the PCIe switch for an assignment of the PCI device in order to share the PCI device among the management server 101 and other servers. If the sharing availability 516 is not "POSSIBLE", the PCI device information acquisition function 213 may notify the display device 220 of an error.

As a result of this request, the PCIe switch changes the assigned state of the changed PCI device, and assigns the changed PCI device to the management server 101 in the dedicated or shared state as in the description of Step 813 in FIG. 8.

Then in Step 100B, the processing in Step 804 in FIG. 8 is carried out, and the OS 210 recognizes the PCI device connected to the management server 101, and searches for a device driver 211. The PCI device information acquisition function 213 determines whether or not the OS 210 has read a device driver 211 for the PCI device.

If the OS 210 cannot read a device driver 211 for the PCI device, the PCI device information acquisition function 213 proceeds to Step 100C, and transmits a notification of requesting for a device driver to the display device 220, thereby notifying the administrator of necessity of manually installing a device driver 211. After the device driver 211 is installed, the PCI device information acquisition function 213 proceeds to Step 1008.

In Step 1008, the PCI device information acquisition function 213 acquires the detailed information on the PCI device via the device driver 211 as described in Step 804.

In Step 1009, the PCI device information acquisition function 213 stores the detailed information on the PCI device acquired in Step 1008 in the PCI device table 217.

In Step 100A, the PCI device information acquisition function 213 transmits the request to cancel the assignment of the PCI device to the management server 101 to the PCIe switch in order to shut off the connection of the PCI device on which the detailed information has been acquired to the management server 101.

The PCI device information acquisition function 213 then returns to the processing in Step 1002, and repeats Steps 1002 to 100A until there are no longer PCI devices to be added or updated.

The detailed information has been acquired for all PCI devices which have been changed in the processing in Step 1002, the PCI device information acquisition function 213 proceeds to processing by the grouping function 214 in Step 1011.

As a result of the above-mentioned processing, when a PCI device is added to the PCIe switch or a PCI device is changed, the changed PCI device is temporality assigned to the management server 101. The OS 210 then reads a device driver 211 for the PCI device, and the PCI device information acquisition function 213 can acquire the detailed information on the PCI device via the device driver 211.

<Grouping Function>

Figure 12:
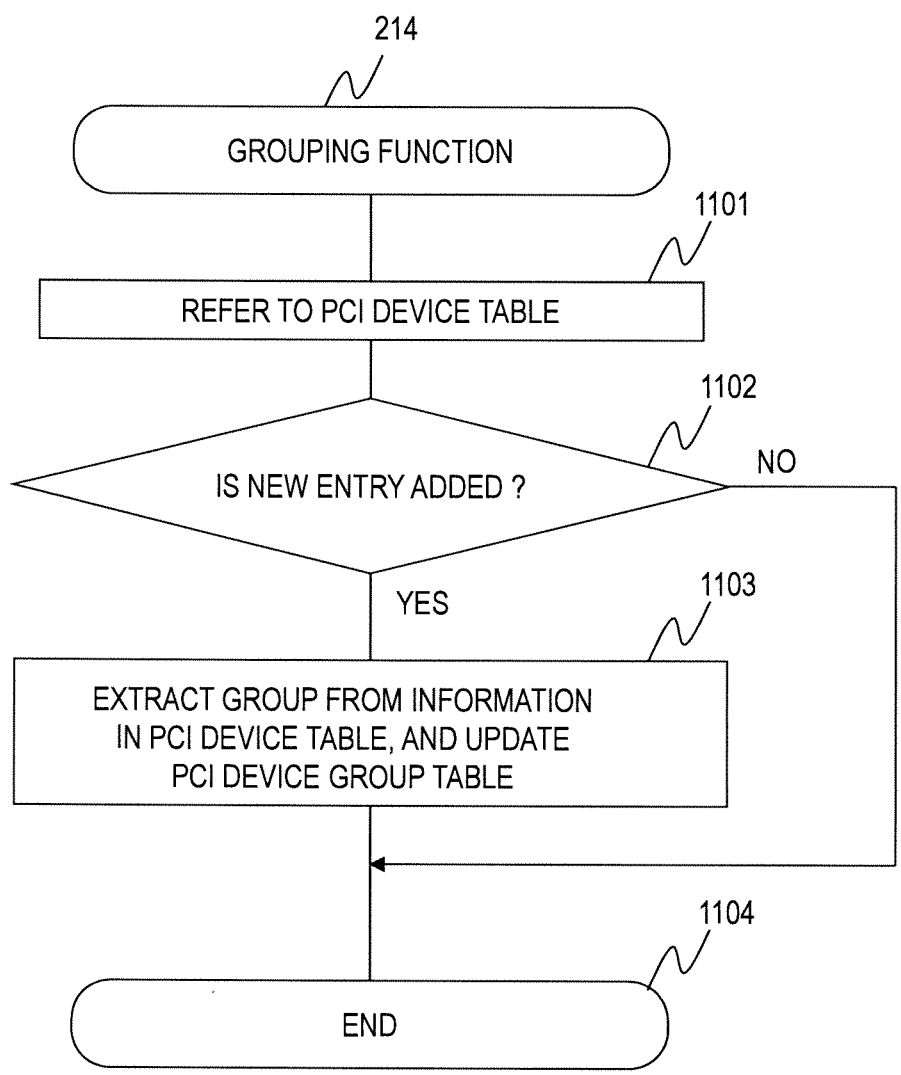
FIG. 12 is a flowchart illustrating an example of the processing by the grouping function according to the first embodiment of this invention.

FIG. 12 is a flowchart illustrating an example of the processing by the grouping function 214 carried out in Step 1011 in FIG. 11.

The grouping function 214 refers to the PCI device table 217 in Step 1101, and determines whether or not a new entry has been added in Step 1102. If a new entry has been added, the information on the PCI device is added, and hence the grouping function 214 proceeds to processing in Step 1103, and otherwise, the grouping function ends in Step 1104.

In Step 1103, the grouping function 214 extracts predetermined items from the information on the new PCI device as conditions for assigning the PCI device to the server, and adds the predetermined items to the PCI device group table 218. As the predetermined items, a search condition of card type+vendor name, a search condition of card type+performance, card type+supported driver, and the like are respectively acquired from the PCI device table 217, and are added to the PCI device group table 218 while a group ID is added thereto.

<PCI Device Assignment Function>

Figure 13:
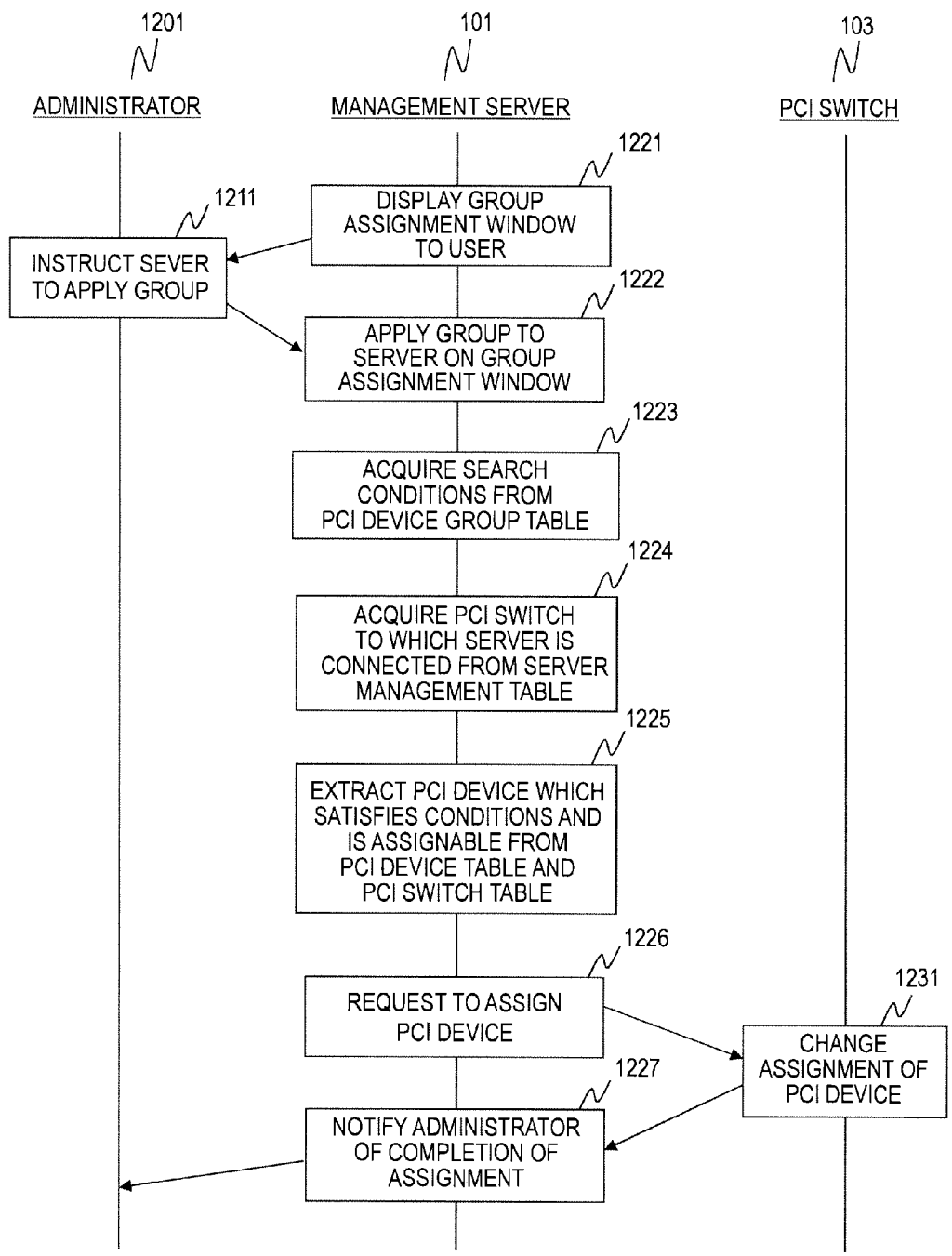
FIG. 13 is a sequence diagram illustrating an overview of the processing by the PCI device assignment function according to the first embodiment of this invention.

FIG. 13 is a sequence diagram illustrating an overview of the processing by the PCI device assignment function 212.

When the administrator or the like assigns a PCI device to a server, the PCI assignment function 212 is started by the management server 101 instructing the activation of the PCI assignment function 212.

After the PCI device assignment function 212 starts, in Step 1221, the PCI device assignment function 212 outputs a group assignment screen as illustrated in FIG. 16 to the display device 220, and receives an input from the input device 230 operated by the administrator.

In Step 1211, the administrator or the like operates the input device 230, thereby selecting a server with which a PCI device is to be assigned and specifying a group (search conditions) of PCI devices to be assigned on the group assignment screen 1501 of the display device 220.

FIG. 16 is a screen image of the group assignment screen 1501. The group assignment screen 1501 is constructed by a server selection section 1502, a port selection section 1503, a search condition specification section 1510, and a PCI device group table display section 1520. The administrator or the like operates the input device 230, thereby specifying a server to which a PCI device is assigned in the server selection section 1502, and specifying a port to which the PCI device is assigned in the port selection section 1503. The search condition specification section 1510 includes checkboxes 1511 and item selection sections 1512 for a plurality of search conditions, and the administrator or the like can operate the input device 230 to properly select the checkboxes and the items. The PCI device group table display section 1520 includes checkboxes 1521, and enables selection of the entry in the PCI device group table 218 illustrated in FIG. 8 as search conditions.

If the administrator or the like selects a server in the server selection section 1502, selects a port in the port selection section 1503, and specifies the checkboxes 1521 in Step 1211 in FIG. 13, the PCI device assignment function 212 starts application of a group of PCI devices specified by the checkboxes 1521 to the server selected by the input received in Step 1222.

In Step 1223, the PCI device assignment function 212 acquires a group ID 711 and search conditions from the PCI device group table 218 corresponding to the entries of the selected checkboxes 1521.

In Step 1224, the PCI device assignment function 212 refers to the server management table 215, thereby acquiring an identifier of a PCIe switch for which a PCI device is searched for from a connected PCI switch ID 613 corresponding to the server specified by the server selection section 1502 and the port specified by the port selection section 1503.

In Step 1225, the PCI device assignment function 212 extracts, from the PCI device table 217 and the PCI switch table 216, a PCI device satisfying the search conditions acquired in Step 1223 out of PCI devices of the PCIe switch corresponding to the connected PCI switch ID 613 acquired in Step 1224.

In Step 1226, the PCI device assignment function 212 transmits an assignment request to the PCIe switch corresponding to the connected PCI switch ID 613 acquired in Step 1224 so that the PCI device extracted in Step 1225 is assigned to the specified server.

The PCIe switch receives the assignment request from the management server 101, changes the connection of the crossbar switch 2006 so that the PCI device specified by the request at a downstream port is connected to the server at an upstream port, and updates the port management table 2005 in Step 1231. The PCIe switch then notifies the management server 101 of the completion of the assignment.

In Step 1227, the PCI device assignment function 212 of the management server 101 receives the assignment completion notification from the PCIe switch, sets the ID of the assigned PCI device, the identifier of the port, and the state of assignment to the PCI switch table 216, and sets the group ID 711 in the PCI device group table 218 corresponding to the checkbox 1521 specified in the group assignment screen 1501 to the server management table 215. The PCI device assignment function 212 then outputs a notification of the completed assignment to the display device 220.

As a result of the above-mentioned processing, by including the information relating to the device driver 2110 and the firmware revision as the detailed information on the PCI device, an optimal PCI device can be easily provided out of a large number of PCI devices corresponding to types and revisions of the OSs of the respective servers when the PCI device is assigned to the server #0 or #1 by means of the PCIe switch.

As a result, the administrator can assign a desired PCI device to a server only by selecting a group ID 711 in the PCI device group table 218 in an environment in which a large number of PCI devices are connected to a PCIe switch.

Figure 14:
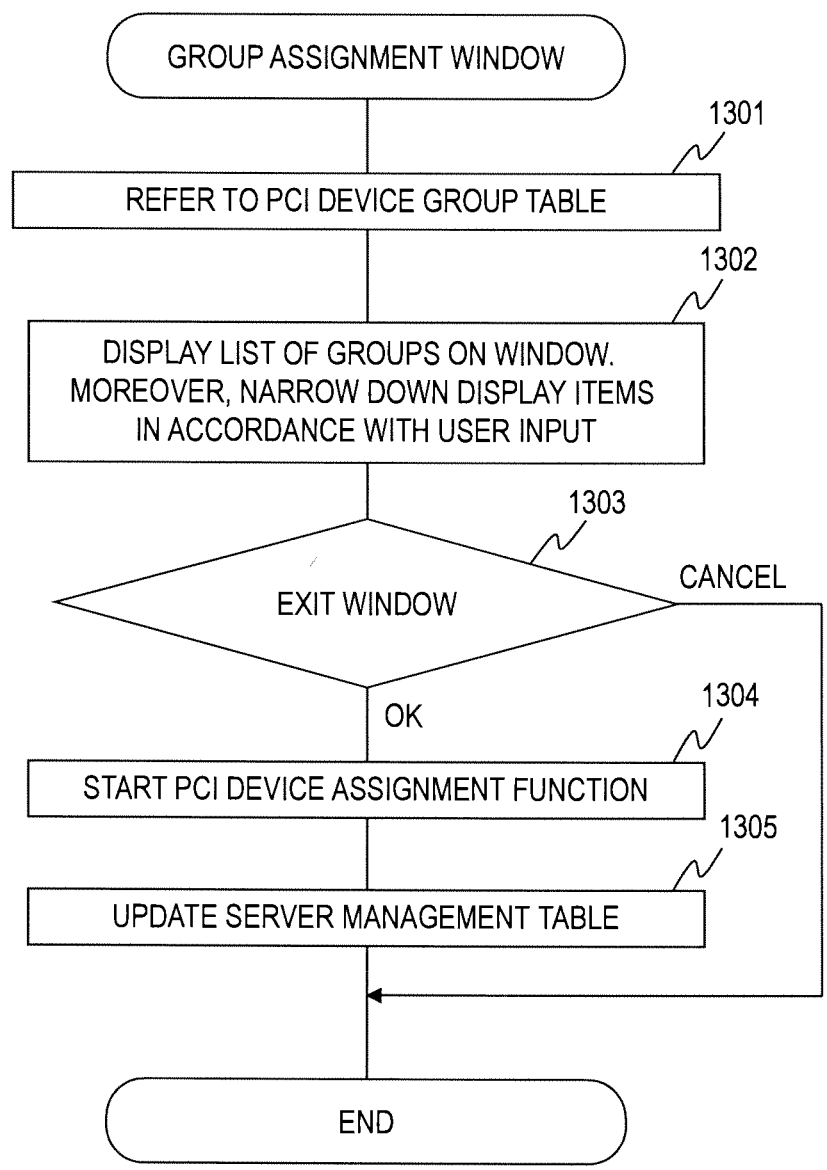
FIG. 14 is a flowchart illustrating details of the processing by the PCI device assignment function according to the first embodiment of this invention.
Figure 15:
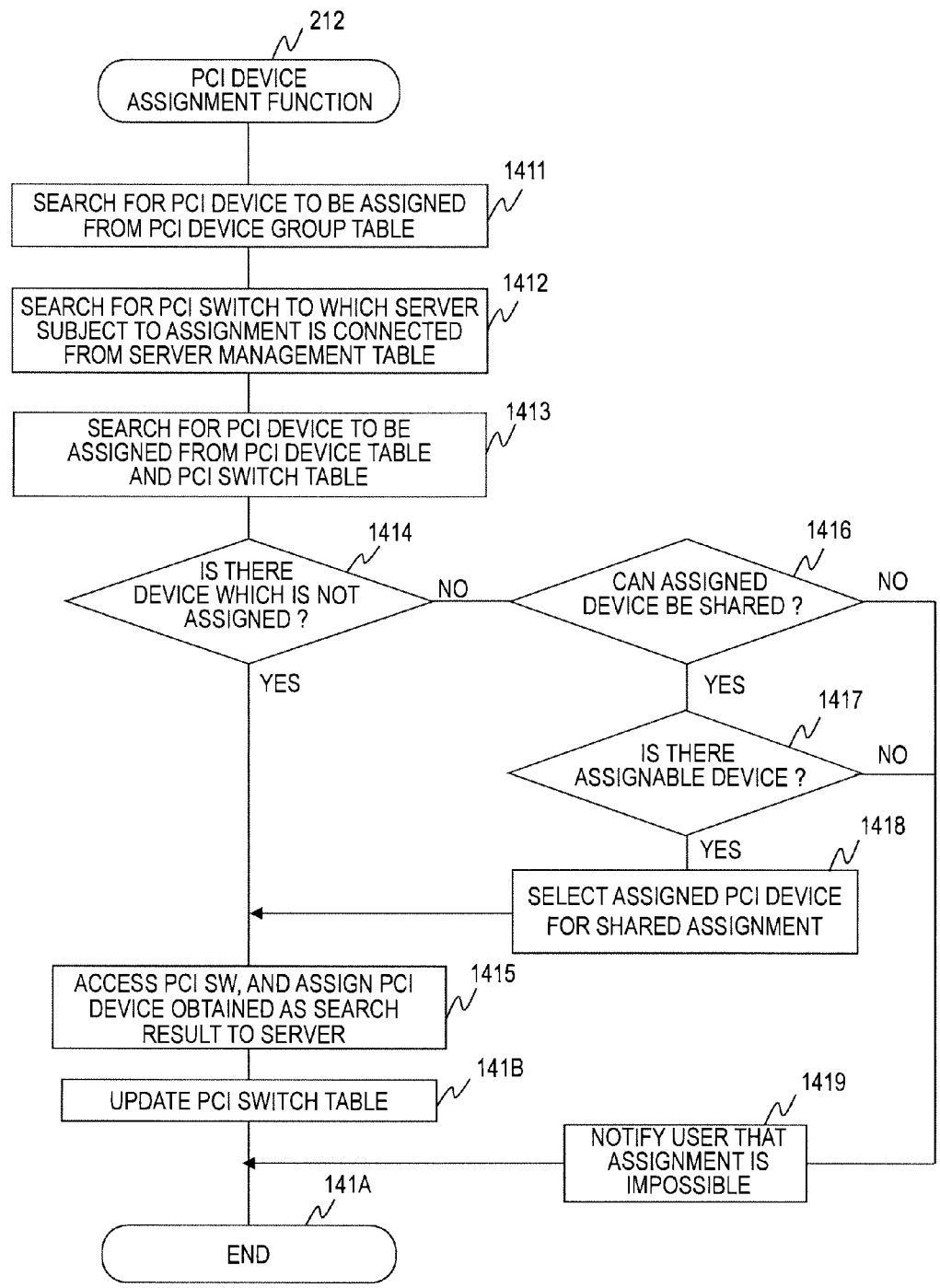
FIG. 15 is a flowchart illustrating details of the PCI device assignment processing carried out in Step 1304 in FIG. 14 according to the first embodiment of this invention.

FIGS. 14 and 15 are flowcharts illustrating details of the processing by the PCI device assignment function 212 of the management server 101.

The PCI device assignment function 212 refers to the PCI device group table 218 in Step 1301 in FIG. 14, and outputs the group assignment screen 1501 illustrated in FIG. 16 on the display device 220 in Step 1302. Then, the PCI device assignment function 212 receives an operation by the administrator or the like on the input device 230, thereby acquiring specified server, port, and search conditions.

Then in Step 1303, the PCI device assignment function 212 waits for an "OK" button or a "CANCEL" button on the group assignment screen 1501 in FIG. 16 to be clicked, and proceeds to Step 1304 if the "OK" button is clicked. If the "CANCEL" button is clicked, the PCI device assignment function 212 simply finishes the processing.

The PCI device assignment function 212 carries out PCI device assignment processing in Step 1304, sets a group ID 711 used for the assignment to the server management table 215 in Step 1305, and finishes the sequence of processing.

FIG. 15 is a flowchart illustrating details of the PCI device assignment processing carried out in Step 1304 in FIG. 14.

In Step 1411, the PCI device assignment function 212 acquires the group ID 711 and the search conditions from the PCI device group table 218 corresponding to the entry of the check boxes 1521 specified in Step 1302.

In Step 1412, the PCI device assignment function 212 refers to the server management table 215, thereby searching for the identifier of the PCIe switch for which the PCI device is searched for from the connected PCI switch ID 613 corresponding to the server specified by the server selection section 1502 and the port specified by the port selection section 1503.

In Step 1413, the PCI device assignment function 212 searches the PCI device table 217 and the PCI switch table 216 for PCI devices satisfying the search conditions acquired in Step 1411 out of the PCI devices of the PCIe switch corresponding to the connected PCI switch ID 613 acquired in Step 1412.

In Step 1414, the PCI device assignment function 212 determines whether or not there are PCI devices which are not assigned out of the PCI devices satisfying the search conditions. If there are PCI devices which are not assigned, the PCI device assignment function 212 proceeds to Step 1415. If there are not PCI devices which are not assigned, the PCI device assignment function 212 proceeds to Step 1416.

In Step 1416, for PCI devices which have already been assigned to other servers out of the PCI devices acquired as a result of the search in Step 1413, the PCI device assignment function 212 refers to the PCI switch table 216, thereby determining whether or not there are PCI devices whose sharing availability 516 is "POSSIBLE". If there are PCI devices whose sharing availability 516 of "POSSIBLE", the PCI device assignment function 212 proceeds to Step 1417, and determines whether or not there are assignable PCI devices out of the sharable PCI devices. If there are assignable PCI devices, the PCI device assignment function 212 proceeds to Step 1418, and sets a PCI device to be assigned in the shared state. On the other hand, if there are no sharable PCI devices, or if there are no assignable PCI devices, the PCI device assignment function 212 proceeds to Step 1419, notifies the display device 220 of the fact that there is no assignable PCI devices, and finishes the processing.

In Step 1415, the PCI device assignment function 212 transmits the assignment request to the PCIe switch corresponding to the connected PCI switch ID 613 so that the PCI device extracted in Step 1414 or 1415 is assigned to the specified server.

Then in Step 141B, the PCI device assignment function 212 receives the notification of the completion of the assignment from the PCIe switch, and then updates the PCI switch table 216.

When a new PCI device is newly added to a PCIe switch, the PCIe switch is instructed to temporarily connect the management server 101 and the PCI device to each other, thereby assigning the new PCI device to the management server 101 according to this embodiment as described above. The OS 210 of the management server 101 reads a device driver 211 of the connected PCI device, and the PCI device information acquisition function acquires the detailed information on the PCI device, and updates the PCI device table 217 and the PCI device group table 218. The connection of the management server 101 and the new PCI device is then shut off to restore the original state.

When a PCI device is to be assigned to a server, the PCI device required by the server can be assigned extremely easily by the PCI device assignment function 212 providing the group assignment screen 1501, thereby allowing the administrator to select search conditions set in advance to the PCI device group table 218.

Second Embodiment

Figure 17:
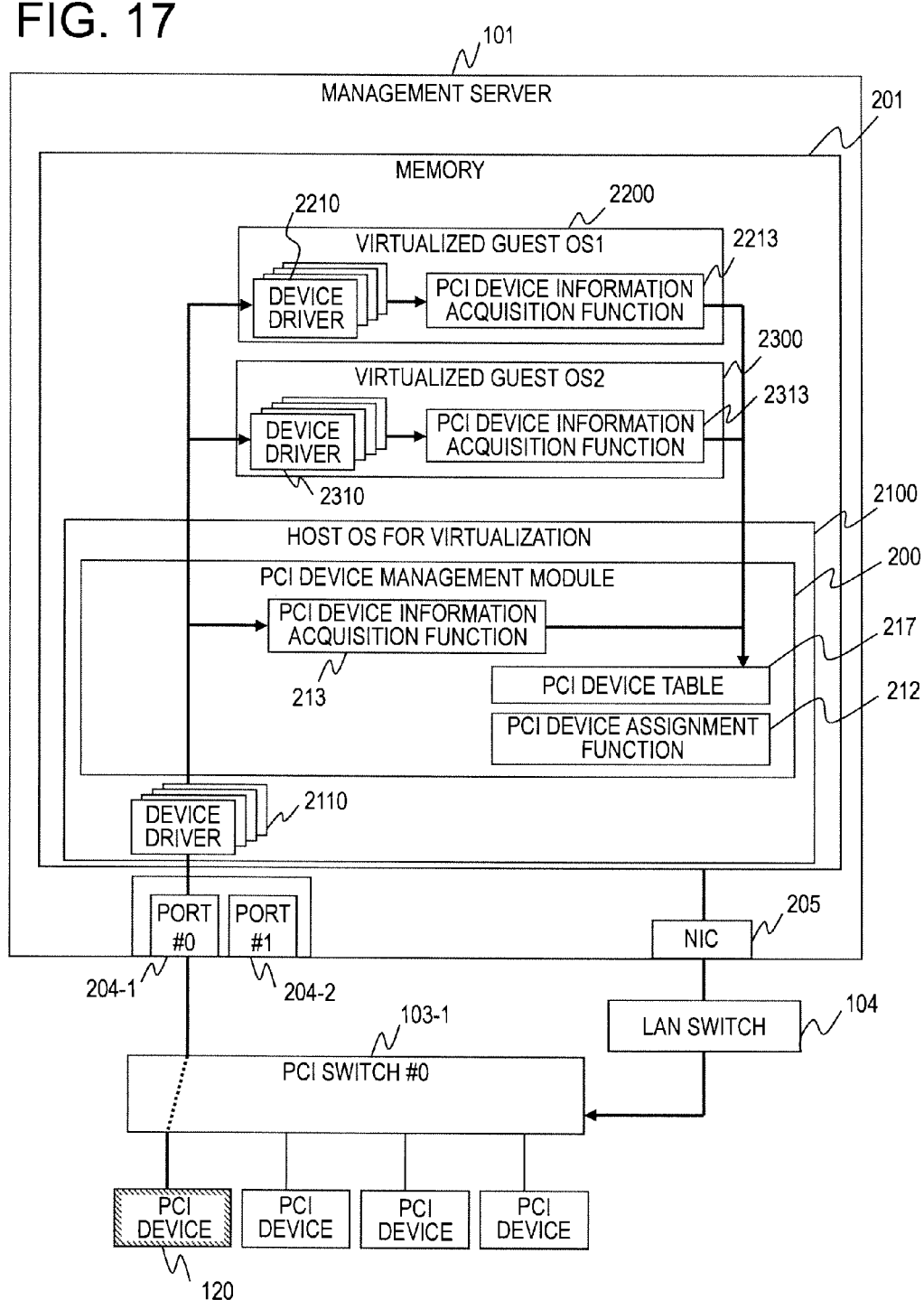
FIG. 17 illustrates a second embodiment of this invention, and is a block diagram illustrating a software configuration of the management server.

FIG. 17 illustrates a second embodiment of this invention, and is a block diagram illustrating a software configuration of the management server 101. According to this embodiment, virtualization technology is used for the management server 101 according to the first embodiment, thereby executing a plurality of types of guest OS, and acquiring the detailed information on a PCI device for each of the types of OS. The other configuration is the same as that of the first embodiment.

Different types of OS can be executed respectively for the servers #0 and #1 in the computer system according to this embodiment, and a device driver for the same PCI device differs depending on each of the OSs. For this purpose, types of OS to be executed on the computer system are being executed as guest OSs 2200, 2300 on the management server 101, the PCI device information acquisition function is executed on each of the guest OSs 2200, 2300, thereby acquiring the detailed information such as information on the device driver for each of the types of OS. The each of the guest OSs 2200, 2300 then stores the detailed information on the PCI device acquired respectively in the PCI device table 217 of the PCI device management module 200 executed by a host OS 2100 for virtualization. As a result, the acquisition of the detailed information on the PCI device corresponding to the types of OS available in the computer system in advance enables efficient assignment of PCI devices.

The host OS 2100 for virtualization is loaded on the memory 201 illustrated in FIG. 2, and is executed by the CPU 202 in the management server 101 in FIG. 17. The virtualized guest OS 2200 and the virtualized guest OS 2300 are executed on the host OS 2100 for virtualization. The host OS 2100 for virtualization, the virtualized guest OS 2200, and the virtualized guest OS 2300 are different types of OS. It should be noted that a virtual machine manager (VMM) and a hypervisor may properly be used as the virtualization technology.

In the host OS 2100 for virtualization, the PCI device management module 200 is executed as in the first embodiment, thereby acquiring the detailed information, as in the first embodiment, on a PCI device by a device driver 2110 when the PCI device is temporarily assigned to the management server 101.

PCI device information acquisition functions 2213, 2313 are executed on the virtualized guest OSs 2200, 2300, thereby acquiring the detailed information, as in the first embodiment, on a PCI device by device drivers 2210, 2310 corresponding to the respective types of OS when the PCI device is temporarily assigned to the management server 101. The PCI device information acquisition functions 2213, 2313 on the virtualized guest OSs 2200, 2300 notify the PCI device information acquisition function 213 on the host OS 2100 of the acquired detailed information on the PCI device. The PCI device information acquisition function 213 on the host OS 2100 stores the detailed information on the PCI device received from the guest OSs 2200, 2300 in the PCI device table 217.

Figure 18:
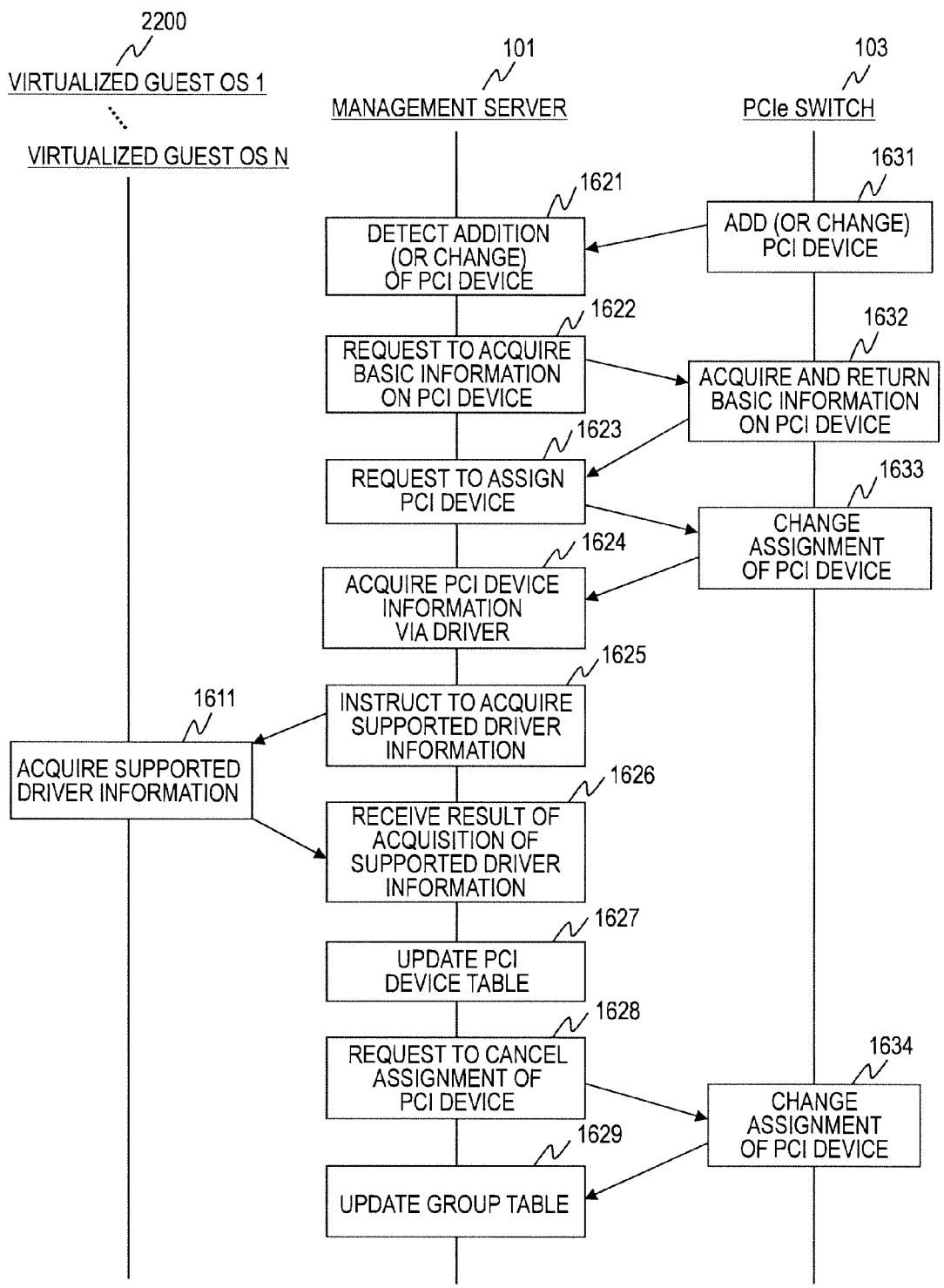
FIG. 18 is a sequence diagram illustrating an example of processing by the PCI device information acquisition function according to the second embodiment of this invention.

FIG. 18 is a sequence diagram illustrating an example of processing by the PCI device information acquisition function executed on the management server 101.

First, in Step 1631, a PCIe switch detects addition or change of a PCI device, and notifies the management server 101 of addition or change of the PCI device via the LAN switch 104 as in the first embodiment.

In Step 1621, the management server 101 receives the notification of change or addition of the PCI device from the PCIe switch, thereby detecting a change generated to the PCI device.

In Step 1622, the management server 101 requests the PCIe switch for basic information on and a connected position of the changed PCI device. The basic information includes the PCI device ID (device number), the card type, and the vendor name and the like. The connected position is the identifier of a downstream port.

In Step 1632, the crossbar switch control module 2004 of the PCIe switch receives the request of the management server 101, and accesses the changed PCI device via the crossbar switch 2006, thereby acquiring the basic information. The basic information is acquired in accordance with the PCI bus protocol. The PCIe switch then transmits the acquired basic information to the management server 101.

In Step 1623, the management server 101, which has received the basic information, requests the PCIe switch to assign the added or changed PCI device at the downstream port to the management server 101.

In Step 1633, the PCIe switch receives the assignment request from the management server 101, and assigns the PCI device to be assigned to the management server 101. The PCIe switch which has assigned the PCI device 120 to the management server 101 notifies the management server 101 of completion of the assignment and contents of the assignment.

Then in Step 1624, the management server 101 loads the device driver 2110 for the host OS 2100 based on the completion notification of the assignment of the PCI device and the basic information received in Step 1623. On this occasion, if the host OS 2100 does not provide a corresponding device driver 2110, the management server 101 requests the administrator for the device driver 2110 as in the first embodiment.

Then in Step 1625, the PCI device information acquisition function 213 on the host OS 2100 instructs the PCI device information acquisition functions 2213, 2313 on the guest OSs 2200, 2300 to acquire the detailed information on the PCI device assigned to the management server 101.

In Step 1611, the guest OSs 2200, 2300, which have received the instruction from the PCI device information acquisition function 213 on the host OS 2100, load the respective device drivers 2210, 2310, and the PCI device information acquisition functions 2213, 2313 respectively acquire detailed information on the PCI device.

The PCI device information acquisition functions 2213, 2313 on the virtualized guest OSs 2200, 2300 acquire the detailed information on the PCI device, and then notify the PCI device information acquisition function 213 on the host OS 2100 of the acquired detailed information on the PCI device.

In Step 1626, the PCI device information acquisition function 213 on the host OS 2100 receives the detailed information on the PCI device respectively from the PCI device information acquisition functions 2213, 2313 of the guest OSs 2200, 2300.

In Step 1627, the PCI device information acquisition function 213 on the host OS 2100 stores in the PCI device table 217 the detailed information on the PCI device acquired via the device driver 2110 of the own OS 2100 and the detailed information acquired respectively from the PCI device information acquisition functions 2213, 2313 of the guest OSs 2200, 2300.

Then in Step 1628, the detailed information on the added or changed PCI device has now been acquired, and the management server 101 transmits a request to cancel the assignment of the PCI device to which the management server 101 presently connects to the PCIe switch.

In Step 1634, the PCIe switch receives the request to cancel the assignment of the management server 101, and releases the connection of the management server 101 and the PCI device as in the first embodiment. When the disconnection of the management server 101 and the PCI device from each other has been completed, the PCIe switch transmits a notification of the completion to the management server 101.

In Step 1629, the management server 101 receives the completion notification of the disconnecting from the PCIe switch, updates the PCI device group table 218 as in the first embodiment, and completes the sequence of processing.

Through the above-mentioned processing, when a PCI device is added to the PCIe switch or a change (removal of a PCI device, addition or removal of a PCIe switch) is made, the PCI device information acquisition function 213 of the management server 101 is activated by a notification from the PCIe switch, and the management server 101 and the changed PCI device are temporarily connected to each other.

The PCI device information acquisition function 213 on the host OS 2100 for virtualization and the PCI device information acquisition functions 2213, 2313 on the guest OSs 2200, 2300 can respectively acquire the detailed information on the PCI device in the management server 101, thereby acquiring respective pieces of the detailed information corresponding to the types of OS.

Third Embodiment

Figure 19:
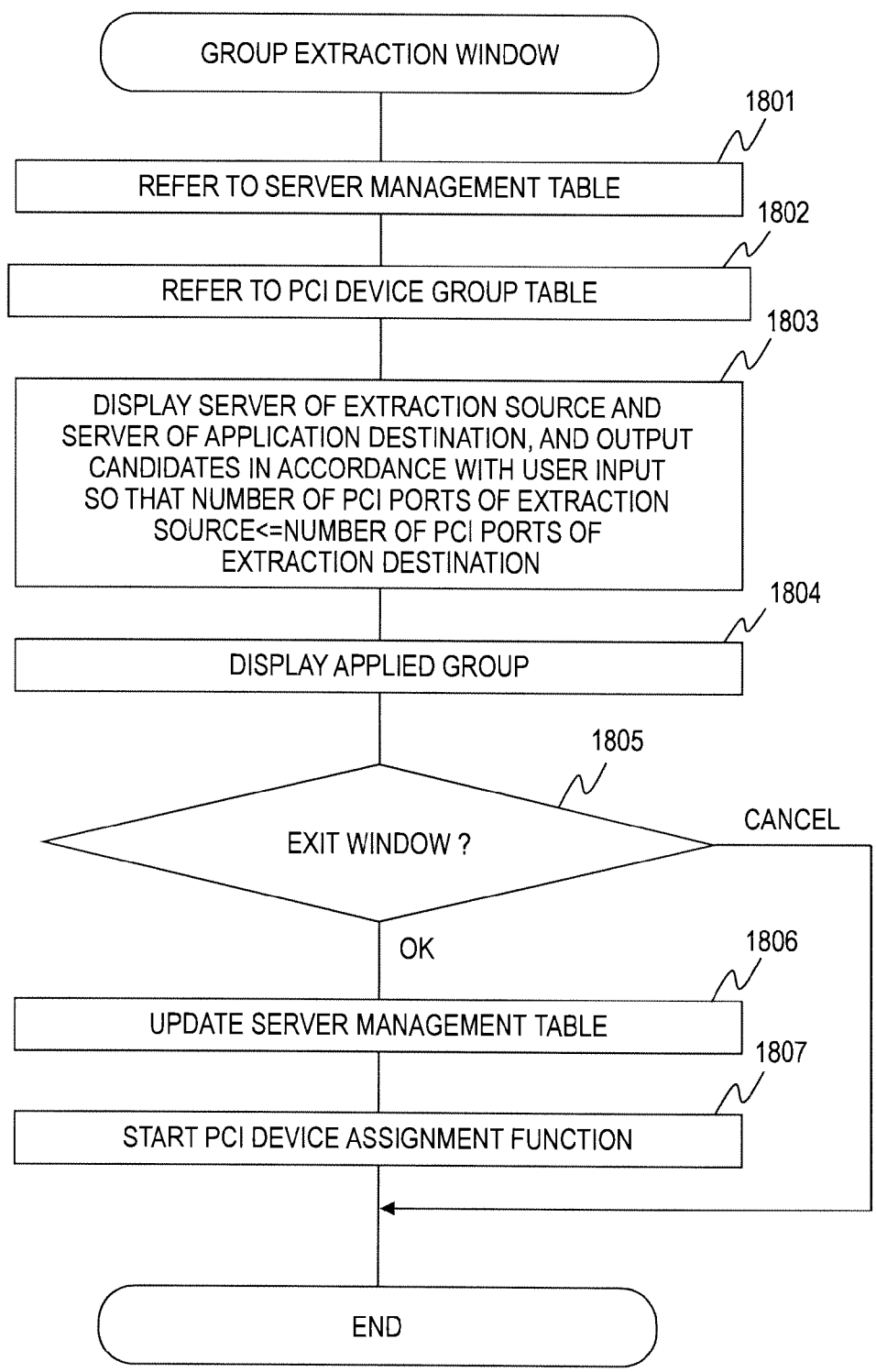
FIG. 19 illustrates a third embodiment of this invention, and is a flowchart illustrating an example of processing by the PCI device assignment function.

FIG. 19 illustrates a third embodiment of this invention, and is a flowchart illustrating an example of processing by the PCI device assignment function 212 of the management server 101.

According to the third embodiment, a configuration of a PCI device in use by an existing server is acquired, and a group of PCI devices under the same conditions as those of this PCI device are generated. Thus, the other configuration is the same as that of the first embodiment.

In Step 1801 in FIG. 19, a user interface (group extraction screen 1901) illustrated in FIG. 20 is output to the display device 220, and receives an application source server 1910 of the PCI device, and an application destination server 1911 to which the extracted conditions of the PCI device is applied from the administrator or the like operating the management server 101. The PCI device assignment function 212 then refers to the server management table 215, and acquires information on the PCI device connected to the extraction source server 1910 (applied group ID and the like).

In Step 1802, the PCI device assignment function 212 refers to the PCI device group table 218, thereby acquiring search conditions corresponding to the applied group ID of the PCI device acquired in Step 1801.

In Step 1803, the PCI device assignment function 212 displays the extraction source server 1901 and the application destination server 1911 received in Step 1801. The PCI device assignment function 212 then extracts from the PCI switch table 216 PCI devices which have the same applied group ID 711 as that of the extraction source server 1910 and which can be assigned to the application destination server 1911. The PCI devices are extracted so that the number of ports of the extraction source server 1910 does not exceed the number of ports of the application destination server 1911 on this occasion.

The PCI device assignment function 212 displays a result of the search in Step 1803 in an applied group 1920 in FIG. 20 in Step 1804. FIG. 20 illustrates a screen image of the group extraction screen.

The PCI device assignment function 212 then waits for an "OK" button or a "CANCEL" button on the group extraction screen 1901 in FIG. 20 to be clicked in Step 1805, and proceeds to Step 1806 if the "OK" button is clicked. If the "CANCEL" button is clicked, the PCI device assignment function 212 simply finishes the processing.

In Step 1806, the PCI device assignment function 212 updates an entry of the server of application destination 1911 in the server management table 215 under the assignment condition (applied group ID 711) of the PCI device selected out of groups of PCI device in FIG. 20.

In Step 1807, processing of assigning the group selected from among the groups of PCI device in FIG. 20 to the application destination server 1911 is carried out. This processing is the same as that in FIG. 15 according to the first embodiment.

As a result of the above-mentioned processing, the same group (configuration of the PCI device) as that of a PCI device operating on an existing server can be applied to another server.

Each of the embodiments describes an example in which the PCI switch management module 200 is executed on the management server 101, but the PCI switch management module 200 may be executed on any one of the plurality of the servers #0 and #1.

As described above, this invention can be applied to a computer system including the PCIe switches, and can particularly be applied to a management system, a management method, and a management program for the PCI devices.

What is claimed is:

1. A management method for a computer system for controlling assignment between computers and PCI devices, the computer system comprising:
   a plurality of the computers each comprising a processor, a memory, and a PCI interface;
   at least one of PCI switches for connecting the plurality of computers via the PCI interfaces;
   a plurality of the PCI devices to be connected to the at least one of PCI switches; and
   a management server comprising a PCI device table for managing the plurality of the PCI devices connected to the at least one of PCI switches, thereby controlling assignment between the plurality of the PCI devices and the plurality of the computers,
   the management method comprising the steps of:
   notifying, by the PCI switch, the management server one of addition and change of the PCI device, and addition of the PCI switch;
   receiving, by the management server, the notification, and requesting the PCI switch to acquire basic information on the PCI device;
   receiving, by the PCI switch, the request to acquire the basic information, acquiring the basic information on the PCI device, and notifying the management server of the basic information;
   receiving, by the management server, the basic information, determining an assigned state of the PCI device as any one of a dedicated state and a shared state, and requesting the PCI switch to assign the PCI device to the management server in the determined assigned state;
   receiving, by the PCI switch, the request of assignment from the management server, and connecting the PCI device and the management server to each other in the assigned state determined by the management server;
   reading, by the management server, a driver for the PCI device connected via the PCI switch, and acquiring detailed information on the PCI device via the driver; and
   storing, by the management server, the acquired detailed information on the PCI device in the PCI device table.

2. The management method for a computer system according to claim 1, further comprising the steps of:
   displaying, by the management server, the detailed information on the PCI as a candidate of search condition for the PCI device assigned to one of the plurality of the computers;
   receiving, by the management server, the search condition and an identifier of one of the plurality of the computers which the PCI device is assigned to;
   searching, by the management server, the PCI device table for the PCI device satisfying the search conditions; and
   requiring, by the management server, the PCI switch to assign the PCI device satisfying the search condition to the specified computer.

3. The management method for a computer system according to claim 2, further comprising the steps of:
   instructing, by the management server, after receiving the detailed information on the PCI device, the PCI switch to release the connection of the PCI device and the management server; and
   releasing, by the PCI switch, the connection of the PCI device and the management server based on the instruction to release the connection, which is received from the management server.

4. The management method for a computer system according to claim 2, wherein:
   the management server comprises a virtual computer; and
   the step of reading, by the management server, a driver for the PCI device connected via the PCI switch, and acquiring detailed information on the PCI device via the driver comprises reading, by the virtual computer, the driver, and acquiring the detailed information on the PCI device via the driver.

5. The management method for a computer system according to claim 2, wherein:
   the management server comprises a management table for managing a connection state between the PCI switch and the computer, and the PCI device assigned to the computer,
   the management method further comprising the steps of:
   receiving, by the management server, a computer of extraction source for extracting a configuration of the PCI device;
   receiving, by the management server, a computer of application destination of the extracted configuration of the PCI device; and
   extracting, by the management server, a PCI device having the same configuration as the PCI device assigned to the computer of extraction source from the management table and the PCI device table, and instructing the PCI switch to assign the extracted PCI device to the computer of application destination.

6. The management method for a computer system according to claim 3, wherein the step of releasing, by the PCI switch, the connection of the PCI device and the management server based on the instruction to release the connection, which is received from the management server, comprises returning one of the dedicated state and the shared state of the PCI device to a state before the connecting to the management server.

7. The management method for a computer system according to claim 4, wherein:
   the management server comprises a plurality of virtual computers, and executes different types of OSs respectively for the plurality of virtual computers; and
   the step of reading, by the management server, a driver for the PCI device connected via the PCI switch, and acquiring detailed information on the PCI device via the driver comprises respectively reading the drivers for the plurality of virtual computers, and acquiring the detailed information on the PCI device via the drivers.

8. A computer system, comprising:
   a plurality of computers each comprising a processor, a memory, and a PCI interface;
   at least one of PCI switches for connecting the plurality of computers via the PCI interfaces;
   a plurality of PCI devices to be connected to the at least one of PCI switches; and
   a management server comprising a PCI device table for managing the plurality of PCI devices connected to the at least one of PCI switches, thereby controlling assignment between the plurality of PCI devices and the plurality of computers, wherein:

the at least one of PCI switches each comprises a control unit configured to:
  notify the management server one of addition and change of the PCI device, and addition of the PCI switch;
  acquire basic information on the PCI device based on a request from the management server, to thereby notify the management server of the basic information; and
  connect the PCI device to one of the management server and the computer based on an assignment request from the management server;
the management server comprises a PCI device information acquisition module for acquiring detailed information on the PCI device when the management server receives the notification indicating one of the addition and the change of the PCI device, and the addition of the PCI switch; and
the PCI device information acquisition module is configured to:
  acquire the basic information on the PCI device from the PCI switch when the PCI device information acquisition module receives the notification from the PCI switch;
  determine an assigned state of the PCI device as any one of a dedicated state and a shared state based on the basic information;
  request the PCI switch to assign the PCI device to the management server in the determined assigned state;
  read a driver for the connected PCI device via the PCI switch;
  acquire detailed information on the PCI device via the driver; and
  store the acquired detailed information on the PCI device in the PCI device table.

9. The computer system according to claim 8, wherein the management server is further configured to:
  display the detailed information on the PCI as a candidate of search condition for the PCI device assigned to one of the plurality of the computers;
  receive the search condition and an identifier of one of the plurality of the computers which the PCI device is assigned to;
  search the PCI device table for the PCI device satisfying the search conditions; and
  require the PCI switch to assign the PCI device satisfying the search condition to the specified computer.

10. The computer system according to claim 9, wherein:
the PCI device information acquisition module acquires the detailed information on the PCI device, and then instructs the PCI switch to release the connection of the PCI device and the management server; and
the PCI switch releases the connection of the PCI device and the management server based on the instruction to release the connection, which is received from the management server.

11. The computer system according to claim 9, wherein:
the management server comprises a virtual computer comprising the PCI device information acquisition module; and
the virtual computer reads the driver, and acquires the detailed information on the PCI device via the driver.

12. The computer system according to claim 9, wherein:
the management server comprises a PCI device assignment module which comprises a management table for managing a connection state between the PCI switch and the computer, and the PCI device assigned to the computer, and assigns the PCI device to the computer based on information in the management table and the PCI device table; and
the PCI device assignment module is configured to:
  receive a computer of extraction source for extracting a configuration of the PCI device;
  receive a computer of application destination of the extracted configuration of the PCI device; and
  extract a PCI device having the same configuration as the PCI device assigned to the computer of extraction source from the management table and the PCI device table, and instruct the PCI switch to assign the extracted PCI device to the computer of application destination.

13. The computer system according to claim 10, wherein the PCI switch returns one of the dedicated state and the shared state of the PCI device to a state before the connecting to the management server when the PCI switch releases the connection of the PCI device and the management server based on the instruction to release the connection received from the management server.

14. The computer system according to claim 11, wherein:
  the management server comprises a plurality of virtual computers each comprising the PCI device information acquisition module; and
  the management server executes different types of OSs respectively for the plurality of virtual computers, reads the drivers for the plurality of virtual computers, and acquires the detailed information on the PCI device via the drivers.

15. A computer-readable non-transitory data storage medium, containing program, which is executed for;
  a plurality of computers each comprising a processor, a memory, and a PCI interface;
  at least one of PCI switches for connecting the plurality of computers via the PCI interfaces;
  a plurality of PCI devices to be connected to the at least one of PCI switches; and
  a management server comprising a PCI device table for managing the plurality of PCI devices connected to the at least one of PCI switches, thereby controlling assignment between the plurality of PCI devices and the plurality of computers,
  the program controlling the management server to execute the procedures of:
  requesting the PCI switch to acquire basic information in the PCI device table when a notification indicating one of addition and change of the PCI device, and addition of the PCI switch is received from the PCI switch;
  acquiring the basic information on the PCI device from the PCI switch, determining an assigned state of the PCI device as any one of a dedicated state and a shared state based on the basic information, and requesting the PCI switch to assign the PCI device to the management server in the determined assigned state;
  reading a driver for the connected PCI device via the PCI switch, and acquiring detailed information on the PCI device via the driver; and
  storing the acquired detailed information on the PCI device in the PCI device table.

16. The computer-readable non-transitory data storage medium, containing program according to claim 15, further controlling the management server to execute the procedures of:
  displaying the detailed information on the PCI as a candidate of search condition for the PCI device assigned to one of the plurality of the computers;

receiving the search condition and an identifier of one of the plurality of the computers which the PCI device is assigned to;

searching the PCI device table for the PCI device satisfying the search conditions; and requiring the PCI switch to assign the PCI device satisfying the search condition to the specified computer.

17. The computer-readable non-transitory data storage medium, containing program according to claim 16, further controlling the management server to execute a procedure of instructing, after acquiring the detailed information of the PCI device, the PCI switch to release the connection of the PCI device and the management server, thereby causing the PCI switch to release the connection of the PCI device and the management server.

18. The computer-readable non-transitory data storage medium, containing program according to claim 16, wherein:

the management server comprises a virtual computer; and the procedure of reading a driver for the connected PCI device via the PCI switch, and acquiring detailed information on the PCI device via the driver comprises reading, by the virtual computer, the driver, and acquiring the detailed information on the PCI device via the driver.

19. The computer-readable non-transitory data storage medium; containing program according to claim 16, wherein;

the management server comprises a management table for managing a connection state between the PCI switch and the computer, and the PCI device assigned to the computer, the program further controlling the management server to execute the procedures of:

receiving a computer of extraction source for extracting a configuration of the PCI device;

receiving a computer of application destination of the extracted configuration of the PCI device; and extracting a PCI device having the same configuration as the PCI device assigned to the computer of extraction source from the management table and the PCI device table, and instructing the PCI switch to assign the extracted PCI device to the computer of application destination.

20. The computer-readable non-transitory data storage medium, containing program according to claim 17, wherein the procedure of instructing, after acquiring the detailed information of the PCI device, the PCI switch to release the connection of the PCI device and the management server, and causing the PCI switch to release the connection of the PCI device and the management server comprises returning one of the dedicated state and the shared state of the PCI device to a state before the connecting to the management server.

21. The computer-readable non-transitory data storage medium, containing program according to claim 18, wherein:

the management server comprises a plurality of virtual computers, and executes different types of OSs respectively for the plurality of virtual computers; and the procedure of reading a driver for the connected PCI device via the PCI switch, and acquiring detailed information on the PCI device via the driver comprises respectively reading, by the plurality of virtual computers, the drivers, and acquiring the detailed information on the PCI device via the drivers.

* * * * *